(12) United States Patent
Kundu et al.

(10) Patent No.: US 11,882,025 B2
(45) Date of Patent: Jan. 23, 2024

(54) SYSTEM AND METHOD FOR FACILITATING EFFICIENT MESSAGE MATCHING IN A NETWORK INTERFACE CONTROLLER (NIC)

(71) Applicant: Hewlett Packard Enterprise Development LP, Houston, TX (US)

(72) Inventors: Partha Pratim Kundu, Palo Alto, CA (US); Andrew S. Kopser, Seattle, WA (US); Duncan Roweth, Bristol (GB); Robert Alverson, Seattle, WA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 166 days.

(21) Appl. No.: 17/594,531

(22) PCT Filed: Mar. 23, 2020

(86) PCT No.: PCT/US2020/024311
§ 371 (c)(1),
(2) Date: Oct. 21, 2021

(87) PCT Pub. No.: WO2020/236295
PCT Pub. Date: Nov. 26, 2020

(65) Prior Publication Data
US 2022/0229800 A1 Jul. 21, 2022

Related U.S. Application Data

(60) Provisional application No. 62/852,273, filed on May 23, 2019, provisional application No. 62/852,203, (Continued)

(51) Int. Cl.
*G06F 13/42* (2006.01)
*H04L 45/02* (2022.01)
(Continued)

(52) U.S. Cl.
CPC .............. *H04L 45/02* (2013.01); *G06F 9/505* (2013.01); *G06F 9/546* (2013.01);
(Continued)

(58) Field of Classification Search
CPC . H04L 49/3018; H04L 49/3027; H04L 49/90; H04L 49/9005; H04L 49/9021;
(Continued)

(56) References Cited

U.S. PATENT DOCUMENTS 4,807,118 A 2/1989 Lin et al.
5,138,615 A 8/1992 Lamport et al.
(Continued)

FOREIGN PATENT DOCUMENTS

CN 101729609 A 6/2010
CN 102932203 A 2/2013
(Continued)

OTHER PUBLICATIONS

Awerbuch, B., et al.; "An On-Demand Secure Routing Protocol Resilient to Byzantine Failures"; Sep. 2002; 10 pages.
(Continued)

*Primary Examiner* — Henry Tsai
*Assistant Examiner* — Kim T Huynh
(74) *Attorney, Agent, or Firm* — Yao Legal Services, Inc.

(57) ABSTRACT

A network interface controller (NIC) capable of performing message passing interface (MPI) list matching is provided. The NIC can include a host interface, a network interface, and a hardware list-processing engine (LPE). The host interface can couple the NIC to a host device. The network interface can couple the NIC to a network. During operation, the LPE can receive a match request and perform MPI list matching based on the received match request.

18 Claims, 9 Drawing Sheets

Related U.S. Application Data filed on May 23, 2019, provisional application No. 62/852,289, filed on May 23, 2019.

(51) Int. Cl.

| | | |
|---|---|---|
| H04L 45/028 | (2022.01) | |
| H04L 45/125 | (2022.01) | |
| H04L 45/00 | (2022.01) | |
| H04L 45/122 | (2022.01) | |
| H04L 47/76 | (2022.01) | |
| H04L 49/15 | (2022.01) | |
| H04L 49/00 | (2022.01) | |
| H04L 69/40 | (2022.01) | |
| H04L 47/10 | (2022.01) | |
| H04L 49/9005 | (2022.01) | |
| H04L 47/34 | (2022.01) | |
| H04L 67/1097 | (2022.01) | |
| G06F 13/16 | (2006.01) | |
| H04L 45/021 | (2022.01) | |
| H04L 47/12 | (2022.01) | |
| H04L 47/2441 | (2022.01) | |
| H04L 47/30 | (2022.01) | |
| H04L 47/62 | (2022.01) | |
| H04L 47/24 | (2022.01) | |
| H04L 49/90 | (2022.01) | |
| G06F 13/38 | (2006.01) | |
| G06F 13/40 | (2006.01) | |
| H04L 45/745 | (2022.01) | |
| H04L 47/2483 | (2022.01) | |
| H04L 47/629 | (2022.01) | |
| H04L 47/80 | (2022.01) | |
| H04L 49/101 | (2022.01) | |
| H04L 45/12 | (2022.01) | |
| H04L 47/122 | (2022.01) | |
| G06F 12/1036 | (2016.01) | |
| G06F 15/173 | (2006.01) | |
| H04L 43/10 | (2022.01) | |
| H04L 45/42 | (2022.01) | |
| H04L 47/11 | (2022.01) | |
| G06F 12/0862 | (2016.01) | |
| G06F 12/1045 | (2016.01) | |
| H04L 47/32 | (2022.01) | |
| G06F 9/54 | (2006.01) | |
| G06F 13/14 | (2006.01) | |
| G06F 9/50 | (2006.01) | |
| H04L 47/22 | (2022.01) | |
| H04L 47/52 | (2022.01) | |
| H04L 47/6275 | (2022.01) | |
| H04L 45/24 | (2022.01) | |
| H04L 45/7453 | (2022.01) | |
| H04L 45/16 | (2022.01) | |
| H04L 69/22 | (2022.01) | |
| H04L 47/762 | (2022.01) | |
| H04L 47/78 | (2022.01) | |
| H04L 47/20 | (2022.01) | |
| H04L 49/9047 | (2022.01) | |
| H04L 1/00 | (2006.01) | |
| H04L 43/0876 | (2022.01) | |
| H04L 47/2466 | (2022.01) | |
| H04L 47/625 | (2022.01) | |
| H04L 69/28 | (2022.01) | |

(52) U.S. Cl.
CPC ...... *G06F 12/0862* (2013.01); *G06F 12/1036* (2013.01); *G06F 12/1063* (2013.01); *G06F 13/14* (2013.01); *G06F 13/16* (2013.01); *G06F 13/1642* (2013.01); *G06F 13/1673* (2013.01); *G06F 13/1689* (2013.01); *G06F 13/385* (2013.01); *G06F 13/4022* (2013.01); *G06F 13/4068* (2013.01); *G06F 13/4221* (2013.01); *G06F 15/17331* (2013.01); *H04L 1/0083* (2013.01); *H04L 43/0876* (2013.01); *H04L 43/10* (2013.01); *H04L 45/021* (2013.01); *H04L 45/028* (2013.01); *H04L 45/122* (2013.01); *H04L 45/123* (2013.01); *H04L 45/125* (2013.01); *H04L 45/16* (2013.01); *H04L 45/20* (2013.01); *H04L 45/22* (2013.01); *H04L 45/24* (2013.01); *H04L 45/38* (2013.01); *H04L 45/42* (2013.01); *H04L 45/46* (2013.01); *H04L 45/566* (2013.01); *H04L 45/70* (2013.01); *H04L 45/745* (2013.01); *H04L 45/7453* (2013.01); *H04L 47/11* (2013.01); *H04L 47/12* (2013.01); *H04L 47/122* (2013.01); *H04L 47/18* (2013.01); *H04L 47/20* (2013.01); *H04L 47/22* (2013.01); *H04L 47/24* (2013.01); *H04L 47/2441* (2013.01); *H04L 47/2466* (2013.01); *H04L 47/2483* (2013.01); *H04L 47/30* (2013.01); *H04L 47/32* (2013.01); *H04L 47/323* (2013.01); *H04L 47/34* (2013.01); *H04L 47/39* (2013.01); *H04L 47/52* (2013.01); *H04L 47/621* (2013.01); *H04L 47/626* (2013.01); *H04L 47/629* (2013.01); *H04L 47/6235* (2013.01); *H04L 47/6275* (2013.01); *H04L 47/76* (2013.01); *H04L 47/762* (2013.01); *H04L 47/781* (2013.01); *H04L 47/80* (2013.01); *H04L 49/101* (2013.01); *H04L 49/15* (2013.01); *H04L 49/30* (2013.01); *H04L 49/3009* (2013.01); *H04L 49/3018* (2013.01); *H04L 49/3027* (2013.01); *H04L 49/90* (2013.01); *H04L 49/9005* (2013.01); *H04L 49/9021* (2013.01); *H04L 49/9036* (2013.01); *H04L 49/9047* (2013.01); *H04L 67/1097* (2013.01); *H04L 69/22* (2013.01); *H04L 69/40* (2013.01); *G06F 2212/50* (2013.01); *G06F 2213/0026* (2013.01); *G06F 2213/3808* (2013.01); *H04L 69/28* (2013.01)

(58) Field of Classification Search
CPC ............ H04L 49/9036; H04L 49/9047; H04L 67/1097; H04L 69/22; H04L 69/40; H04L 69/28; H04L 47/125; H04L 47/263; H04L 47/26; H04L 47/6255; G06F 2212/50; G06F 2213/0026; G06F 2213/3808; G06F 13/4265

See application file for complete search history.

(56) References Cited

U.S. PATENT DOCUMENTS

| | | |
|---|---|---|
| 5,457,687 A | 10/1995 | Newman |
| 5,937,436 A | 8/1999 | Watkins |
| 5,960,178 A | 9/1999 | Cochinwala et al. |
| 5,970,232 A | 10/1999 | Passint et al. |
| 5,983,332 A | 11/1999 | Watkins |
| 6,112,265 A | 8/2000 | Harriman et al. |
| 6,230,252 B1 | 5/2001 | Passint et al. |
| 6,246,682 B1 | 6/2001 | Roy et al. |
| 6,493,347 B2 | 12/2002 | Sindhu et al. |
| 6,545,981 B1 | 4/2003 | Garcia et al. |
| 6,633,580 B1 | 10/2003 | Toerudbakken et al. |
| 6,674,720 B1 | 1/2004 | Passint et al. |
| 6,714,553 B1 | 3/2004 | Poole et al. |
| 6,728,211 B1 | 4/2004 | Peris et al. |

(56) References Cited

U.S. PATENT DOCUMENTS

| | | |
|---|---|---|
| 6,732,212 B2 | 5/2004 | Sugahara et al. |
| 6,735,173 B1 | 5/2004 | Enoski et al. |
| 6,894,974 B1 | 5/2005 | Aweva et al. |
| 7,023,856 B1 | 4/2006 | Washabaugh et al. |
| 7,133,940 B2 | 11/2006 | Blightman et al. |
| 7,218,637 B1 | 5/2007 | Best et al. |
| 7,269,180 B2 | 9/2007 | Bly et al. |
| 7,305,487 B2 | 12/2007 | Blumrich et al. |
| 7,337,285 B2 | 2/2008 | Tanoue |
| 7,397,797 B2 | 7/2008 | Alfieri et al. |
| 7,430,559 B2 | 9/2008 | Lomet |
| 7,441,006 B2 | 10/2008 | Biran et al. |
| 7,464,174 B1 | 12/2008 | Ngai |
| 7,483,442 B1 | 1/2009 | Torudbaken et al. |
| 7,562,366 B2 | 7/2009 | Pope et al. |
| 7,593,329 B2 | 9/2009 | Kwan et al. |
| 7,596,628 B2 | 9/2009 | Aloni et al. |
| 7,620,791 B1 | 11/2009 | Wentzlaff et al. |
| 7,633,869 B1 | 12/2009 | Morris et al. |
| 7,639,616 B1 | 12/2009 | Manula et al. |
| 7,734,894 B1 | 6/2010 | Wentzlaff et al. |
| 7,774,461 B2 | 8/2010 | Tanaka et al. |
| 7,782,869 B1 | 8/2010 | Chitlur Srinivasa |
| 7,796,579 B2 | 9/2010 | Bruss |
| 7,856,026 B1 | 12/2010 | Finan et al. |
| 7,933,282 B1 | 4/2011 | Gupta et al. |
| 7,953,002 B2 | 5/2011 | Opsasnick |
| 7,975,120 B2 | 7/2011 | Sabbatini, Jr. et al. |
| 8,014,278 B1 | 9/2011 | Subramanian et al. |
| 8,023,521 B2 | 9/2011 | Woo et al. |
| 8,050,180 B2 | 11/2011 | Judd |
| 8,077,606 B1 | 12/2011 | Mark |
| 8,103,788 B1 | 1/2012 | Miranda |
| 8,160,085 B2 | 4/2012 | Voruganti et al. |
| 8,175,107 B1 | 5/2012 | Yalagandula et al. |
| 8,249,072 B2 * | 8/2012 | Sugumar ............ G06F 15/17337 370/392 |
| 8,281,013 B2 | 10/2012 | Mundkur et al. |
| 8,352,727 B2 | 1/2013 | Chen et al. |
| 8,353,003 B2 | 1/2013 | Noehring et al. |
| 8,443,151 B2 | 5/2013 | Tang et al. |
| 8,473,783 B2 | 6/2013 | Andrade et al. |
| 8,543,534 B2 | 9/2013 | Alves et al. |
| 8,619,793 B2 | 12/2013 | Lavian et al. |
| 8,626,957 B2 | 1/2014 | Blumrich et al. |
| 8,650,582 B2 | 2/2014 | Archer et al. |
| 8,706,832 B2 | 4/2014 | Blocksome |
| 8,719,543 B2 | 5/2014 | Kaminski et al. |
| 8,811,183 B1 | 8/2014 | Anand et al. |
| 8,948,175 B2 | 2/2015 | Bly et al. |
| 8,966,457 B2 * | 2/2015 | Ebcioglu ............. G06F 12/0895 717/136 |
| 8,971,345 B1 | 3/2015 | McCanne et al. |
| 9,001,663 B2 | 4/2015 | Attar et al. |
| 9,053,012 B1 | 6/2015 | Northcott et al. |
| 9,088,496 B2 | 7/2015 | Vaidya et al. |
| 9,094,327 B2 | 7/2015 | Jacobs et al. |
| 9,178,782 B2 | 11/2015 | Matthews et al. |
| 9,208,071 B2 | 12/2015 | Talagala et al. |
| 9,218,278 B2 | 12/2015 | Talagala et al. |
| 9,231,876 B2 | 1/2016 | Mir et al. |
| 9,231,888 B2 | 1/2016 | Bogdanski et al. |
| 9,239,804 B2 | 1/2016 | Kegel et al. |
| 9,269,438 B2 | 2/2016 | Nachimuthu et al. |
| 9,276,864 B1 | 3/2016 | Pradeep |
| 9,436,651 B2 | 9/2016 | Underwood et al. |
| 9,455,915 B2 | 9/2016 | Sinha et al. |
| 9,460,178 B2 | 10/2016 | Bashyam et al. |
| 9,479,426 B2 | 10/2016 | Munger et al. |
| 9,496,991 B2 | 11/2016 | Plamondon et al. |
| 9,544,234 B1 | 1/2017 | Markine |
| 9,548,924 B2 | 1/2017 | Pettit et al. |
| 9,594,521 B2 | 3/2017 | Blagodurov et al. |
| 9,635,121 B2 | 4/2017 | Mathew et al. |
| 9,742,855 B2 | 8/2017 | Shuler et al. |
| 9,762,488 B2 | 9/2017 | Previdi et al. |
| 9,762,497 B2 | 9/2017 | Kishore et al. |
| 9,830,273 B2 | 11/2017 | Bk et al. |
| 9,838,500 B1 | 12/2017 | Ilan et al. |
| 9,853,900 B1 | 12/2017 | Mula et al. |
| 9,887,923 B2 | 2/2018 | Chorafakis et al. |
| 10,003,544 B2 | 6/2018 | Liu et al. |
| 10,009,270 B1 | 6/2018 | Stark et al. |
| 10,031,857 B2 | 7/2018 | Menachem et al. |
| 10,050,896 B2 | 8/2018 | Yang et al. |
| 10,061,613 B1 | 8/2018 | Brooker et al. |
| 10,063,481 B1 | 8/2018 | Jiang et al. |
| 10,089,220 B1 | 10/2018 | McKelvie et al. |
| 10,169,060 B1 | 1/2019 | Vincent et al. |
| 10,178,035 B2 | 1/2019 | Dillon |
| 10,200,279 B1 | 2/2019 | Aljaedi |
| 10,218,634 B2 | 2/2019 | Aldebert et al. |
| 10,270,700 B2 | 4/2019 | Burnette et al. |
| 10,305,772 B2 | 5/2019 | Zur et al. |
| 10,331,590 B2 | 6/2019 | MacNamara et al. |
| 10,353,833 B2 | 7/2019 | Hagspiel et al. |
| 10,454,835 B2 | 10/2019 | Contavalli et al. |
| 10,498,672 B2 | 12/2019 | Graham et al. |
| 10,567,307 B2 | 2/2020 | Fairhurst et al. |
| 10,728,173 B1 | 7/2020 | Agrawal et al. |
| 10,802,828 B1 | 10/2020 | Volpe et al. |
| 10,817,502 B2 | 10/2020 | Talagala et al. |
| 11,128,561 B1 | 9/2021 | Matthews et al. |
| 11,271,869 B1 | 3/2022 | Agrawal et al. |
| 11,416,749 B2 | 8/2022 | Bshara et al. |
| 11,444,886 B1 | 9/2022 | Stawitzky et al. |
| 2001/0010692 A1 | 8/2001 | Sindhu et al. |
| 2001/0047438 A1 | 11/2001 | Forin |
| 2002/0174279 A1 | 11/2002 | Wynne et al. |
| 2003/0016808 A1 | 1/2003 | Hu et al. |
| 2003/0041168 A1 | 2/2003 | Musoll |
| 2003/0110455 A1 | 6/2003 | Baumgartner et al. |
| 2003/0174711 A1 | 9/2003 | Shankar |
| 2003/0200363 A1 | 10/2003 | Futral |
| 2003/0223420 A1 | 12/2003 | Ferolito |
| 2004/0008716 A1 | 1/2004 | Stiliadis |
| 2004/0059828 A1 | 3/2004 | Hooper et al. |
| 2004/0095882 A1 | 5/2004 | Hamzah et al. |
| 2004/0133634 A1 | 7/2004 | Luke et al. |
| 2004/0223452 A1 | 11/2004 | Santos et al. |
| 2005/0021837 A1 | 1/2005 | Haselhorst et al. |
| 2005/0047334 A1 | 3/2005 | Paul et al. |
| 2005/0088969 A1 | 4/2005 | Carlsen et al. |
| 2005/0091396 A1 | 4/2005 | Nilakantan et al. |
| 2005/0108444 A1 | 5/2005 | Flauaus et al. |
| 2005/0108518 A1 | 5/2005 | Pandya |
| 2005/0152274 A1 | 7/2005 | Simpson |
| 2005/0182854 A1 | 8/2005 | Pinkerton et al. |
| 2005/0270974 A1 | 12/2005 | Mayhew |
| 2005/0270976 A1 | 12/2005 | Yang et al. |
| 2006/0023705 A1 | 2/2006 | Zoranovic et al. |
| 2006/0067347 A1 | 3/2006 | Naik et al. |
| 2006/0075480 A1 | 4/2006 | Noehring et al. |
| 2006/0174251 A1 | 8/2006 | Pope et al. |
| 2006/0203728 A1 | 9/2006 | Kwan et al. |
| 2007/0061433 A1 | 3/2007 | Reynolds et al. |
| 2007/0070901 A1 | 3/2007 | Aloni et al. |
| 2007/0198804 A1 | 8/2007 | Moyer |
| 2007/0211746 A1 | 9/2007 | Oshikiri et al. |
| 2007/0242611 A1 | 10/2007 | Archer et al. |
| 2007/0268825 A1 | 11/2007 | Corwin et al. |
| 2008/0013453 A1 | 1/2008 | Chiang et al. |
| 2008/0013549 A1 | 1/2008 | Okagawa et al. |
| 2008/0071757 A1 | 3/2008 | Ichiriu et al. |
| 2008/0084864 A1 | 4/2008 | Archer et al. |
| 2008/0091915 A1 | 4/2008 | Moertl et al. |
| 2008/0126553 A1 * | 5/2008 | Boucher ................ H04L 69/16 709/230 |
| 2008/0147881 A1 | 6/2008 | Krishnamurthy et al. |
| 2008/0159138 A1 | 7/2008 | Shepherd et al. |
| 2008/0253289 A1 | 10/2008 | Naven et al. |
| 2009/0003212 A1 | 1/2009 | Kwan et al. |
| 2009/0010157 A1 | 1/2009 | Holmes et al. |
| 2009/0013175 A1 | 1/2009 | Elliott |

(56) References Cited

U.S. PATENT DOCUMENTS

| | | |
|---|---|---|
| 2009/0055496 A1 | 2/2009 | Garg et al. |
| 2009/0092046 A1 | 4/2009 | Naven et al. |
| 2009/0141621 A1 | 6/2009 | Fan et al. |
| 2009/0198958 A1 | 8/2009 | Arimilli et al. |
| 2009/0259713 A1 | 10/2009 | Blumrich et al. |
| 2009/0285222 A1 | 11/2009 | Hoover et al. |
| 2010/0061241 A1 | 3/2010 | Sindhu et al. |
| 2010/0169608 A1 | 7/2010 | Kuo et al. |
| 2010/0172260 A1 | 7/2010 | Kwan et al. |
| 2010/0183024 A1 | 7/2010 | Gupta |
| 2010/0220595 A1 | 9/2010 | Petersen |
| 2010/0274876 A1 | 10/2010 | Kagan et al. |
| 2010/0302942 A1 | 12/2010 | Shankar et al. |
| 2010/0316053 A1 | 12/2010 | Miyoshi et al. |
| 2011/0051724 A1 | 3/2011 | Scott et al. |
| 2011/0066824 A1 | 3/2011 | Bestler |
| 2011/0072179 A1 | 3/2011 | Lacroute et al. |
| 2011/0099326 A1 | 4/2011 | Jung et al. |
| 2011/0110383 A1 | 5/2011 | Yang et al. |
| 2011/0128959 A1 | 6/2011 | Bando et al. |
| 2011/0158096 A1 | 6/2011 | Leung et al. |
| 2011/0158248 A1 | 6/2011 | Vorunganti et al. |
| 2011/0164496 A1 | 7/2011 | Loh et al. |
| 2011/0173370 A1 | 7/2011 | Jacobs et al. |
| 2011/0264822 A1 | 10/2011 | Ferguson et al. |
| 2011/0276699 A1 | 11/2011 | Pedersen |
| 2011/0280125 A1 | 11/2011 | Jayakumar |
| 2011/0320724 A1 | 12/2011 | Mejdrich et al. |
| 2012/0093505 A1 | 4/2012 | Yeap et al. |
| 2012/0102506 A1 | 4/2012 | Hopmann et al. |
| 2012/0117423 A1 | 5/2012 | Andrade et al. |
| 2012/0137075 A1 | 5/2012 | Vorbach |
| 2012/0144064 A1 | 6/2012 | Parker et al. |
| 2012/0144065 A1 | 6/2012 | Parker et al. |
| 2012/0147752 A1 | 6/2012 | Ashwood-Smith et al. |
| 2012/0170462 A1 | 7/2012 | Sinha |
| 2012/0170575 A1 | 7/2012 | Mehra |
| 2012/0213118 A1 | 8/2012 | Lindsay et al. |
| 2012/0250512 A1 | 10/2012 | Jagadeeswaran et al. |
| 2012/0287821 A1 | 11/2012 | Godfrey et al. |
| 2012/0297083 A1 | 11/2012 | Ferguson et al. |
| 2012/0300669 A1 | 11/2012 | Zahavi |
| 2012/0314707 A1 | 12/2012 | Epps et al. |
| 2013/0010636 A1 | 1/2013 | Regula |
| 2013/0039169 A1 | 2/2013 | Schlansker et al. |
| 2013/0060944 A1 | 3/2013 | Archer et al. |
| 2013/0103777 A1 | 4/2013 | Kagan et al. |
| 2013/0121178 A1 | 5/2013 | Mainaud et al. |
| 2013/0136090 A1 | 5/2013 | Liu et al. |
| 2013/0182704 A1 | 7/2013 | Jacobs et al. |
| 2013/0194927 A1 | 8/2013 | Yamaguchi et al. |
| 2013/0203422 A1 | 8/2013 | Masputra et al. |
| 2013/0205002 A1 | 8/2013 | Wang et al. |
| 2013/0208593 A1 | 8/2013 | Nandagopal |
| 2013/0246552 A1 | 9/2013 | Underwood et al. |
| 2013/0290673 A1 | 10/2013 | Archer et al. |
| 2013/0301645 A1 | 11/2013 | Bogdanski et al. |
| 2013/0304988 A1 | 11/2013 | Totolos et al. |
| 2013/0311525 A1 | 11/2013 | Neerincx et al. |
| 2013/0329577 A1 | 12/2013 | Suzuki et al. |
| 2013/0336164 A1 | 12/2013 | Yang et al. |
| 2014/0019661 A1 | 1/2014 | Hormuth et al. |
| 2014/0032695 A1 | 1/2014 | Michels et al. |
| 2014/0036680 A1 | 2/2014 | Lih et al. |
| 2014/0064082 A1 | 3/2014 | Yeung et al. |
| 2014/0095753 A1 | 4/2014 | Crupnicoff et al. |
| 2014/0098675 A1 | 4/2014 | Frost et al. |
| 2014/0119367 A1 | 5/2014 | Han et al. |
| 2014/0122560 A1 | 5/2014 | Ramey et al. |
| 2014/0129664 A1 | 5/2014 | McDaniel et al. |
| 2014/0133292 A1 | 5/2014 | Yamatsu et al. |
| 2014/0136646 A1 | 5/2014 | Tamir et al. |
| 2014/0169173 A1 | 6/2014 | Naouri et al. |
| 2014/0185621 A1 | 7/2014 | Decusatis et al. |
| 2014/0189174 A1 | 7/2014 | Ajanovic et al. |
| 2014/0207881 A1 | 7/2014 | Nussle et al. |
| 2014/0211804 A1 | 7/2014 | Makikeni et al. |
| 2014/0226488 A1 | 8/2014 | Shamis et al. |
| 2014/0241164 A1 | 8/2014 | Cociglio et al. |
| 2014/0258438 A1 | 9/2014 | Ayoub |
| 2014/0301390 A1 | 10/2014 | Scott et al. |
| 2014/0307554 A1 | 10/2014 | Basso et al. |
| 2014/0325013 A1 | 10/2014 | Tamir et al. |
| 2014/0328172 A1 | 11/2014 | Kumar et al. |
| 2014/0347997 A1 | 11/2014 | Bergamasco et al. |
| 2014/0362698 A1 | 12/2014 | Arad |
| 2014/0369360 A1 | 12/2014 | Carlstrom |
| 2014/0379847 A1 | 12/2014 | Williams |
| 2015/0003247 A1 | 1/2015 | Mejia et al. |
| 2015/0006849 A1 | 1/2015 | Xu et al. |
| 2015/0009823 A1 | 1/2015 | Ganga et al. |
| 2015/0026361 A1 | 1/2015 | Matthews et al. |
| 2015/0029848 A1 | 1/2015 | Jain |
| 2015/0055476 A1 | 2/2015 | Decusatis et al. |
| 2015/0055661 A1 | 2/2015 | Boucher et al. |
| 2015/0067095 A1 | 3/2015 | Gopal et al. |
| 2015/0089495 A1 | 3/2015 | Persson et al. |
| 2015/0103667 A1 | 4/2015 | Elias et al. |
| 2015/0124826 A1 | 5/2015 | Edsall et al. |
| 2015/0146527 A1 | 5/2015 | Kishore et al. |
| 2015/0154004 A1 | 6/2015 | Aggarwal |
| 2015/0161064 A1 | 6/2015 | Pope |
| 2015/0180782 A1 | 6/2015 | Rimmer et al. |
| 2015/0186318 A1 | 7/2015 | Kim et al. |
| 2015/0193262 A1 | 7/2015 | Archer et al. |
| 2015/0195388 A1 | 7/2015 | Snyder et al. |
| 2015/0208145 A1 | 7/2015 | Parker et al. |
| 2015/0220449 A1 | 8/2015 | Stark et al. |
| 2015/0237180 A1 | 8/2015 | Swartzentruber et al. |
| 2015/0244617 A1 | 8/2015 | Nakil et al. |
| 2015/0244804 A1 | 8/2015 | Warfield et al. |
| 2015/0261434 A1 | 9/2015 | Kagan et al. |
| 2015/0263955 A1 | 9/2015 | Talaski et al. |
| 2015/0263994 A1 | 9/2015 | Haramaty et al. |
| 2015/0288626 A1 | 10/2015 | Aybay |
| 2015/0365337 A1 | 12/2015 | Pannell |
| 2015/0370586 A1 | 12/2015 | Cooper et al. |
| 2016/0006664 A1 | 1/2016 | Sabato et al. |
| 2016/0012002 A1 | 1/2016 | Arimilli et al. |
| 2016/0028613 A1 | 1/2016 | Haramaty et al. |
| 2016/0065455 A1 | 3/2016 | Wang et al. |
| 2016/0094450 A1 | 3/2016 | Ghanwani et al. |
| 2016/0134518 A1 | 5/2016 | Callon et al. |
| 2016/0134535 A1 | 5/2016 | Callon |
| 2016/0134559 A1 | 5/2016 | Abel et al. |
| 2016/0134573 A1 | 5/2016 | Gagliardi et al. |
| 2016/0142318 A1 | 5/2016 | Beecroft |
| 2016/0154756 A1 | 6/2016 | Dodson et al. |
| 2016/0182383 A1 | 6/2016 | Pedersen |
| 2016/0205023 A1 | 7/2016 | Janardhanan |
| 2016/0226797 A1 | 8/2016 | Aravinthan et al. |
| 2016/0254991 A1 | 9/2016 | Eckert et al. |
| 2016/0259394 A1 | 9/2016 | Ragavan |
| 2016/0283422 A1 | 9/2016 | Crupnicoff et al. |
| 2016/0285545 A1 | 9/2016 | Schmidtke et al. |
| 2016/0285677 A1 | 9/2016 | Kashyap et al. |
| 2016/0294694 A1 | 10/2016 | Parker et al. |
| 2016/0294926 A1 | 10/2016 | Zur et al. |
| 2016/0301610 A1 | 10/2016 | Amit et al. |
| 2016/0344620 A1 | 11/2016 | G. Santos et al. |
| 2016/0381189 A1 | 12/2016 | Caulfield et al. |
| 2017/0024263 A1 | 1/2017 | Verplanken |
| 2017/0039063 A1 | 2/2017 | Gopal et al. |
| 2017/0041239 A1 | 2/2017 | Goldenberg et al. |
| 2017/0048144 A1 | 2/2017 | Liu |
| 2017/0054633 A1 | 2/2017 | Underwood et al. |
| 2017/0091108 A1 | 3/2017 | Arellano et al. |
| 2017/0097840 A1 | 4/2017 | Bridgers |
| 2017/0103108 A1 | 4/2017 | Datta et al. |
| 2017/0118090 A1 | 4/2017 | Pettit et al. |
| 2017/0118098 A1 | 4/2017 | Littlejohn et al. |
| 2017/0153852 A1 | 6/2017 | Ma et al. |
| 2017/0177541 A1 | 6/2017 | Berman et al. |
| 2017/0220500 A1 | 8/2017 | Tong |

(56) References Cited

U.S. PATENT DOCUMENTS

| | | |
|---|---|---|
| 2017/0237654 A1 | 8/2017 | Turner et al. |
| 2017/0237671 A1 | 8/2017 | Rimmer et al. |
| 2017/0242753 A1 | 8/2017 | Sherlock et al. |
| 2017/0250914 A1 | 8/2017 | Caulfield et al. |
| 2017/0251394 A1 | 8/2017 | Johansson et al. |
| 2017/0270051 A1 | 9/2017 | Chen et al. |
| 2017/0272331 A1 | 9/2017 | Mendle |
| 2017/0272370 A1 | 9/2017 | Ganga et al. |
| 2017/0286316 A1 | 10/2017 | Doshi et al. |
| 2017/0289066 A1 | 10/2017 | Haramaty et al. |
| 2017/0295098 A1 | 10/2017 | Watkins et al. |
| 2017/0324664 A1 | 11/2017 | Xu et al. |
| 2017/0371778 A1 | 12/2017 | McKelvie et al. |
| 2018/0004705 A1 | 1/2018 | Menachem et al. |
| 2018/0019948 A1 | 1/2018 | Patwardhan et al. |
| 2018/0026878 A1 | 1/2018 | Zahavi et al. |
| 2018/0077064 A1 | 3/2018 | Wang |
| 2018/0083868 A1 | 3/2018 | Cheng |
| 2018/0097645 A1 | 4/2018 | Rajagopalan et al. |
| 2018/0097912 A1 | 4/2018 | Chumbalkar et al. |
| 2018/0113618 A1 | 4/2018 | Chan et al. |
| 2018/0115469 A1 | 4/2018 | Erickson et al. |
| 2018/0131602 A1 | 5/2018 | Civanlar et al. |
| 2018/0131678 A1 | 5/2018 | Agarwal et al. |
| 2018/0150374 A1 | 5/2018 | Ratcliff |
| 2018/0152317 A1 | 5/2018 | Chang et al. |
| 2018/0152357 A1 | 5/2018 | Natham et al. |
| 2018/0173557 A1 | 6/2018 | Nakil et al. |
| 2018/0183724 A1 | 6/2018 | Callard et al. |
| 2018/0191609 A1 | 7/2018 | Caulfield et al. |
| 2018/0198736 A1 | 7/2018 | Labonte et al. |
| 2018/0212876 A1 | 7/2018 | Bacthu et al. |
| 2018/0212902 A1 | 7/2018 | Steinmacher-Burow |
| 2018/0219804 A1* | 8/2018 | Graham ............... H04L 49/901 |
| 2018/0225238 A1 | 8/2018 | Karguth et al. |
| 2018/0234343 A1 | 8/2018 | Zdornov et al. |
| 2018/0254945 A1 | 9/2018 | Bogdanski et al. |
| 2018/0260324 A1 | 9/2018 | Marathe et al. |
| 2018/0278540 A1 | 9/2018 | Shalev et al. |
| 2018/0287928 A1 | 10/2018 | Levi et al. |
| 2018/0323898 A1 | 11/2018 | Dods |
| 2018/0335974 A1 | 11/2018 | Simionescu et al. |
| 2018/0341494 A1 | 11/2018 | Sood et al. |
| 2019/0007349 A1 | 1/2019 | Wang et al. |
| 2019/0018808 A1 | 1/2019 | Beard et al. |
| 2019/0036771 A1 | 1/2019 | Sharpless et al. |
| 2019/0042337 A1 | 2/2019 | Dinan et al. |
| 2019/0042518 A1 | 2/2019 | Marolia et al. |
| 2019/0044809 A1 | 2/2019 | Willis et al. |
| 2019/0044827 A1 | 2/2019 | Ganapathi et al. |
| 2019/0044863 A1 | 2/2019 | Mula et al. |
| 2019/0044872 A1 | 2/2019 | Ganapathi et al. |
| 2019/0044875 A1 | 2/2019 | Murty et al. |
| 2019/0052327 A1 | 2/2019 | Motozuka et al. |
| 2019/0058663 A1 | 2/2019 | Song |
| 2019/0068501 A1 | 2/2019 | Schneider et al. |
| 2019/0081903 A1 | 3/2019 | Kobayashi et al. |
| 2019/0095134 A1 | 3/2019 | Li |
| 2019/0104057 A1 | 4/2019 | Goel et al. |
| 2019/0104206 A1 | 4/2019 | Goel et al. |
| 2019/0108106 A1 | 4/2019 | Aggarwal et al. |
| 2019/0108332 A1 | 4/2019 | Ha |
| 2019/0109791 A1 | 4/2019 | Mehra et al. |
| 2019/0121781 A1* | 4/2019 | Kasichainula .... G06F 15/17331 |
| 2019/0140979 A1 | 5/2019 | Levi et al. |
| 2019/0146477 A1 | 5/2019 | Cella et al. |
| 2019/0171612 A1 | 6/2019 | Shahar et al. |
| 2019/0196982 A1 | 6/2019 | Rozas et al. |
| 2019/0199646 A1 | 6/2019 | Singh et al. |
| 2019/0253354 A1 | 8/2019 | Caulfield et al. |
| 2019/0280978 A1 | 9/2019 | Schmatz et al. |
| 2019/0294575 A1 | 9/2019 | Dennison et al. |
| 2019/0306134 A1 | 10/2019 | Shanbhogue et al. |
| 2019/0332314 A1 | 10/2019 | Zhang et al. |
| 2019/0334624 A1 | 10/2019 | Bernard |
| 2019/0356611 A1 | 11/2019 | Das et al. |
| 2019/0361728 A1 | 11/2019 | Kumar et al. |
| 2019/0379610 A1 | 12/2019 | Srinivasan et al. |
| 2020/0036644 A1 | 1/2020 | Belogolovy et al. |
| 2020/0084150 A1 | 3/2020 | Burstein et al. |
| 2020/0145725 A1 | 5/2020 | Eberle et al. |
| 2020/0177505 A1 | 6/2020 | Li |
| 2020/0177521 A1 | 6/2020 | Blumrich et al. |
| 2020/0259755 A1 | 8/2020 | Wang et al. |
| 2020/0272579 A1 | 8/2020 | Humphrey et al. |
| 2020/0274832 A1 | 8/2020 | Humphrey et al. |
| 2020/0334195 A1 | 10/2020 | Chen et al. |
| 2020/0349098 A1 | 11/2020 | Caulfield et al. |
| 2020/0364088 A1* | 11/2020 | Ashwathnarayan .. G06F 9/5016 |
| 2021/0081410 A1 | 3/2021 | Chavan et al. |
| 2021/0152494 A1 | 5/2021 | Johnsen et al. |
| 2021/0263779 A1 | 8/2021 | Haghighat et al. |
| 2021/0334206 A1 | 10/2021 | Colgrove et al. |
| 2021/0377156 A1 | 12/2021 | Michael et al. |
| 2021/0409351 A1 | 12/2021 | Das et al. |
| 2022/0131768 A1 | 4/2022 | Ganapathi et al. |
| 2022/0166705 A1 | 5/2022 | Froese |
| 2022/0200900 A1 | 6/2022 | Roweth |
| 2022/0210058 A1 | 6/2022 | Bataineh et al. |
| 2022/0217078 A1 | 7/2022 | Ford et al. |
| 2022/0217101 A1 | 7/2022 | Yefet et al. |
| 2022/0245072 A1 | 8/2022 | Roweth et al. |
| 2022/0278941 A1 | 9/2022 | Shalev et al. |
| 2022/0309025 A1 | 9/2022 | Chen et al. |
| 2023/0035420 A1 | 2/2023 | Sankaran et al. |
| 2023/0046221 A1 | 2/2023 | Pismenny et al. |

FOREIGN PATENT DOCUMENTS

| | | |
|---|---|---|
| CN | 110324249 A | 10/2019 |
| CN | 110601888 A | 12/2019 |
| EP | 0275135 A2 | 7/1988 |
| EP | 2187576 A1 | 5/2010 |
| EP | 2219329 A1 | 8/2010 |
| EP | 2947832 A1 | 11/2015 |
| EP | 3445006 A1 | 2/2019 |
| JP | 2003-244196 A | 8/2003 |
| JP | 3459653 B2 | 10/2003 |
| KR | 10-2012-0062864 A | 6/2012 |
| KR | 10-2012-0082739 A | 7/2012 |
| KR | 10-2014-0100529 A | 8/2014 |
| KR | 10-2015-0026939 A | 3/2015 |
| KR | 10-2015-0104056 A | 9/2015 |
| KR | 10-2017-0110106 A | 10/2017 |
| KR | 10-1850749 B1 | 4/2018 |
| WO | 2001/069851 A2 | 9/2001 |
| WO | 02/47329 A2 | 6/2002 |
| WO | 2003/019861 A2 | 3/2003 |
| WO | 2004/001615 A1 | 12/2003 |
| WO | 2005/094487 A2 | 10/2005 |
| WO | 2007/034184 A2 | 3/2007 |
| WO | 2009/010461 A2 | 1/2009 |
| WO | 2009/018232 A1 | 2/2009 |
| WO | 2014/092780 A1 | 6/2014 |
| WO | 2014/137382 A1 | 9/2014 |
| WO | 2014/141005 A1 | 9/2014 |
| WO | 2018/004977 A1 | 1/2018 |
| WO | 2018/046703 A1 | 3/2018 |
| WO | 2019/072072 A1 | 4/2019 |

OTHER PUBLICATIONS

Belayneh L.W., et al.; "Method and Apparatus for Routing Data in an Inter-Nodal Communications Lattice of a Massively Parallel Computer System by Semi-Randomly Varying Routing Policies for Different Packets"; 2019; 3 pages.

Bhatele, A., et al.; "Analyzing Network Health and Congestion in Dragonfly-based Supercomputers"; May 23-27, 2016; 10 pages.

Blumrich, M.A., et al.; "Exploiting Idle Resources in a High-Radix Switch for Supplemental Storage"; Nov. 2018; 13 pages.

(56) References Cited

OTHER PUBLICATIONS

Chang, F., et al.; "PVW: Designing Vir PVW: Designing Virtual World Ser orld Server Infr er Infrastructur astructure"; 2010; 8 pages.
Chang, F., et al.; "PVW: Designing Virtual World Server Infrastructure"; 2010; 8 pages.
Chen, F., et al.; "Requirements for RoCEv3 Congestion Management"; Mar. 21, 2019; 8 pages.
Cisco Packet Tracer; "packet-tracer;—ping"; https://www.cisco.com/c/en/us/td/docs/security/asa/asa-command-reference/1-R/cmdref2/p1.html; 2017.
Cisco; "Understanding Rapid Spanning Tree Protocol (802.1w)"; Aug. 1, 2017; 13 pages.
Eardley, ED, P; "Pre-Congestion Notification (PCN) Architecture"; Jun. 2009; 54 pages.
Escudero-Sahuquillo, J., et al.; "Combining Congested-Flow Isolation and Injection Throttling in HPC Interconnection Networks"; Sep. 13-16, 2011; 3 pages.
Hong, Y.; "Mitigating the Cost, Performance, and Power Overheads Induced by Load Variations in Multicore Cloud Servers"; Fall 2013; 132 pages.
Huawei; "The Lossless Network For Data Centers"; Nov. 7, 2017; 15 pages.
International Search Report and Written Opinion received for PCT Application No. PCT/US2020/024248, dated Jul. 8, 2020, 11 pages.
International Search Report and Written Opinion received for PCT Application No. PCT/US20/024332, dated Jul. 8, 2020, 13 pages.
International Search Report and Written Opinion received for PCT Application No. PCT/US20/24243, dated Jul. 9, 2020, 10 pages.
International Search Report and Written Opinion received for PCT Application No. PCT/US20/24253, dated Jul. 6, 2020, 12 pages.
International Search Report and Written Opinion received for PCT Application No. PCT/US20/24256, dated Jul. 7, 2020, 11 pages.
International Search Report and Written Opinion received for PCT Application No. PCT/US20/24257, dated Jul. 7, 2020, 10 pages.
International Search Report and Written Opinion received for PCT Application No. PCT/US20/24258, dated Jul. 7, 2020, 9 pages.
International Search Report and Written Opinion received for PCT Application No. PCT/US20/24259, dated Jul. 9, 2020, 13 pages.
International Search Report and Written Opinion received for PCT Application No. PCT/US20/24260, dated Jul. 7, 2020, 11 pages.
International Search Report and Written Opinion received for PCT Application No. PCT/US20/24268, dated Jul. 9, 2020, 11 pages.
International Search Report and Written Opinion received for PCT Application No. PCT/US20/24269, dated Jul. 9, 2020, 11 pages.
International Search Report and Written Opinion received for PCT Application No. PCT/US20/24339, dated Jul. 8, 2020, 11 pages.
International Search Report and Written Opinion received for PCT Application No. PCT/US2020/024125, dated Jul. 10, 2020, 5 pages.
International Search Report and Written Opinion received for PCT Application No. PCT/US2020/024129, dated Jul. 10, 2020, 11 pages.
International Search Report and Written Opinion received for PCT Application No. PCT/US2020/024237, dated Jul. 14, 2020, 5 pages.
International Search Report and Written Opinion received for PCT Application No. PCT/US2020/024239, dated Jul. 14, 2020, 11 pages.
International Search Report and Written Opinion received for PCT Application No. PCT/US2020/024241, dated Jul. 14, 2020, 13 pages.
International Search Report and Written Opinion received for PCT Application No. PCT/US2020/024242, dated Jul. 6, 2020, 11 pages.
International Search Report and Written Opinion received for PCT Application No. PCT/US2020/024244, dated Jul. 13, 2020, 10 pages.
International Search Report and Written Opinion received for PCT Application No. PCT/US2020/024245, dated Jul. 14, 2020, 11 pages.
International Search Report and Written Opinion received for PCT Application No. PCT/US2020/024246, dated Jul. 14, 2020, 10 pages.
International Search Report and Written Opinion received for PCT Application No. PCT/US2020/024250, dated Jul. 14, 2020, 12 pages.
International Search Report and Written Opinion received for PCT Application No. PCT/US2020/024254, dated Jul. 13, 2020, 10 pages.
International Search Report and Written Opinion received for PCT Application No. PCT/US2020/024262, dated Jul. 13, 2020, 10 pages.
International Search Report and Written Opinion received for PCT Application No. PCT/US2020/024266, dated Jul. 9, 2020, 10 pages.
International Search Report and Written Opinion received for PCT Application No. PCT/US2020/024270, dated Jul. 10, 2020, 13 pages.
International Search Report and Written Opinion received for PCT Application No. PCT/US2020/024271, dated Jul. 9, 2020, 10 pages.
International Search Report and Written Opinion received for PCT Application No. PCT/US2020/024272, dated Jul. 9, 2020, 10 pages.
International Search Report and Written Opinion received for PCT Application No. PCT/US2020/024276, dated Jul. 13, 2020, 9 pages.
International Search Report and Written Opinion received for PCT Application No. PCT/US2020/024304, dated Jul. 15, 2020, 11 pages.
International Search Report and Written Opinion received for PCT Application No. PCT/US2020/024321, dated Jul. 9, 2020, 9 pages.
International Search Report and Written Opinion received for PCT Application No. PCT/US2020/024324, dated Jul. 14, 2020, 10 pages.
International Search Report and Written Opinion received for PCT Application No. PCT/US2020/024327, dated Jul. 10, 2020, 15 pages.
International Search Report and Written Opinion received for PCT Application No. PCT/US2020/24158, dated Jul. 6, 2020, 18 pages.
International Search Report and Written Opinion received for PCT Application No. PCT/US2020/24251, dated Jul. 6, 2020, 11 pages.
International Search Report and Written Opinion received for PCT Application No. PCT/US2020/24267, dated Jul. 6, 2020, 9 pages.
International Search Report and Written Opinion received for PCT Patent Application No. PCT/US20/24303, dated Oct. 21, 2020, 9 pages.
International Search Report and Written Opinion received for PCT Application No. PCT/US2020/024311, dated Jul. 17, 2020, 8 pages.
Underwood, K.D., et al.; "A hardware acceleration unit for MPI queue processing"; Apr. 18, 2005; 10 pages.
Ramakrishnan et al., RFC 3168, "The addition of Explicit Congestion Notification (ECN) to IP", Sep. 2001 (Year: 2001).
International Search Report and Written Opinion received for PCT Patent Application No. PCT/US20/24340, dated Oct. 26, 2020, 9 pages.
International Search Report and Written Opinion received for PCT Patent Application No. PCT/US20/24342, dated Oct. 27, 2020, 10 pages.
International Search Report and Written Opinion received for PCT Patent Application No. PCT/US2020/024192, dated Oct. 23, 2020, 9 pages.
International Search Report and Written Opinion received for PCT Patent Application No. PCT/US2020/024221, dated Oct. 26, 2020, 9 pages.
International Search Report cited in PCT/US2020/024170 dated Dec. 16, 2020; 3 pages.
Maabi, S., et al.; "ERFAN: Efficient reconfigurable fault-tolerant deflection routing algorithm for 3-D Network-on-Chip"; Sep. 6-9, 2016.
Maglione-Mathey, G., et al.; "Scalable Deadlock-Free Deterministic Minimal-Path Routing Engine for InfiniBand-Based Dragonfly Networks"; Aug. 21, 2017; 15 pages.
Mamidala, A.R., et al.; "Efficient Barrier and Allreduce on Infiniband clusters using multicast and adaptive algorithms"; Sep. 20-23, 2004; 10 pages.

(56) References Cited

OTHER PUBLICATIONS

Mammeri, Z; "Reinforcement Learning Based Routing in Networks: Review and Classification of Approaches"; Apr. 29, 2019; 35 pages.
Mollah; M. A., et al.; "High Performance Computing Systems. Performance Modeling, Benchmarking, and Simulation: 8th International Workshop"; Nov. 13, 2017.
Open Networking Foundation; "OpenFlow Switch Specification"; Mar. 26, 2015; 283 pages.
Prakash, P., et al.; "The TCP Outcast Problem: Exposing Unfairness in Data Center Networks"; 2011; 15 pages.
Ramakrishnan, K., et al.; "The Addition of Explicit Congestion Notification (ECN) to IP"; Sep. 2001; 63 pages.
Roth, P. C., et al.; "MRNet: A Software-Based Multicast/Reduction Network for Scalable Tools1"; Nov. 15-21, 2003; 16 pages.
Silveira, J., et al.; "Preprocessing of Scenarios for Fast and Efficient Routing Reconfiguration in Fault-Tolerant NoCs"; Mar. 4-6, 2015.
Tsunekawa, K.; "Fair bandwidth allocation among LSPs for AF class accommodating TCP and UDP traffic in a Diffserv-capable MPLS network"; Nov. 17, 2005; 9 pages.
Wu, J.; "Fault-tolerant adaptive and minimal routing in mesh-connected multicomputers using extended safety levels"; Feb. 2000; 11 pages.
Xiang, D., et al.; "Fault-Tolerant Adaptive Routing in Dragonfly Networks"; Apr. 12, 2017; 15 pages.
Xiang, D., et al.; "Deadlock-Free Broadcast Routing in Dragonfly Networks without Virtual Channels", submission to IEEE transactions on Parallel and Distributed Systems, 2015, 15 pages.
Extended European Search Report and Search Opinion received for EP Application No. 20809930.9, dated Mar. 2, 2023, 9 pages.
Extended European Search Report and Search Opinion received for EP Application No. 20810784.7, dated Mar. 9, 2023, 7 pages.

* cited by examiner

SYSTEM AND METHOD FOR FACILITATING EFFICIENT MESSAGE MATCHING IN A NETWORK INTERFACE CONTROLLER (NIC)

BACKGROUND

Field

This is generally related to the technical field of networking. More specifically, this disclosure is related to systems and methods for facilitating high-speed MPI (message passing interface) list matching in a network interface controller (NIC).

Related Art

As network-enabled devices and applications become progressively more ubiquitous, various types of traffic as well as the ever-increasing network load continue to demand more performance from the underlying network architecture. For example, applications such as high-performance computing (HPC), media streaming, and Internet of Things (JOT) can generate different types of traffic with distinctive characteristics. As a result, in addition to conventional network performance metrics such as bandwidth and delay, network architects continue to face challenges such as scalability, versatility, and efficiency.

SUMMARY

A network interface controller (NIC) capable of performing message passing interface (MPI) list matching is provided. The NIC can include a host interface, a network interface, and a hardware list-processing engine (LPE). The host interface can couple the NIC to a host device. The network interface can couple the NIC to a network. During operation, the LPE can receive a match request and perform MPI list matching based on the received match request.

BRIEF DESCRIPTION OF THE FIGURES

In the figures, like reference numerals refer to the same figure elements.

DETAILED DESCRIPTION

Figure 1:
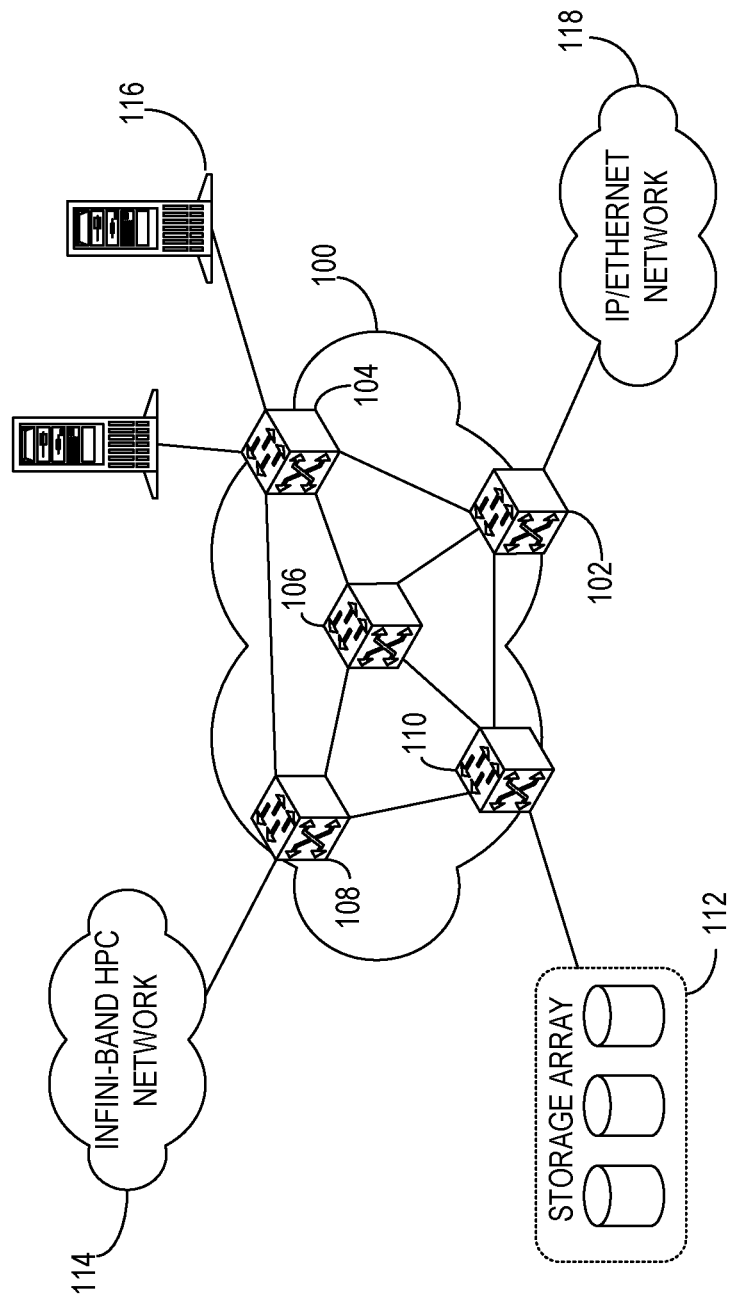
FIG. 1 shows an exemplary network.

Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown.

Overview

The present disclosure describes systems and methods that facilitate efficient list matching in a network interface controller (NIC). The NIC implements a hardware list-processing engine coupled to a memory unit. The list-processing engine can achieve high-speed list matching. The list-processing engine (LPE) can perform atomic search and search-with-delete operators in the various lists defined by the message passing interface (MPI) protocol and can dispatch list operations to correct matching units. To enhance speed, multiple processing engines can be used, and each processing engine can include multiple memory banks, which are interconnected using a crossbar. In addition, the LPE achieves list-matching acceleration by separation of endpoint network interfaces. The list-matching hardware can reduce latency by overlapping the matching-attempt pipeline state with the match termination condition, and can use unified search pipeline for priority and unexpected lists and for network search and host append commands. The LPE hardware can also use a unified processing pipeline to search persistent list entries pertaining to an unordered network interface as well as to search entries pertaining to an ordered network interface. The NIC can also process MPI messages, using either the "eager" protocol or the "rendezvous" protocol in an efficient manner.

One embodiment provides a NIC capable of performing MPI list matching.

The NIC can include a host interface, a network interface, and a hardware LPE. The host interface can couple the NIC to a host device. The network interface can couple the NIC to a network. During operation, the LPE can receive a match request and perform MPI list matching based on the received match request.

In a variation on this embodiment, the match request can include a match request corresponding to a command received via the host interface or a match request corresponding to a message received via the network interface.

In a further variation, the NIC can include a first set of match-request queues for match requests corresponding to received commands and a second set of match-request queues for match requests corresponding to received messages. The number of queues in the first or second set of match-request queues corresponds to the number of physical endpoints supported by the NIC.

In a further variation, the message is an MPI message.

In a further variation, the message is based on an eager protocol or a rendezvous protocol associated with MPI.

In a variation on this embodiment, the hardware list-processing engine can include a plurality of processing elements; and a respective processing element comprises a plurality of matching engines and a plurality of memory banks storing one or more lists, wherein the memory banks are interconnected with the matching engines using a crossbar.

In a further variation, a respective matching engine can include a unified search pipeline for searching the one or more lists, and the one or more lists can include a priority list and an unexpected list.

In a further variation, a respective matching engine can include a single pipeline stage to perform, in parallel, a match operation on a previous match request and a computation to determine a current read or write address.

In a variation on this embodiment, the hardware list-processing engine can include a persistent list entry cache to store previously matched list entries to enable fast searches.

In a variation on this embodiment, the list-processing engine can perform atomic search operations in a plurality of lists.

Figure 2A:
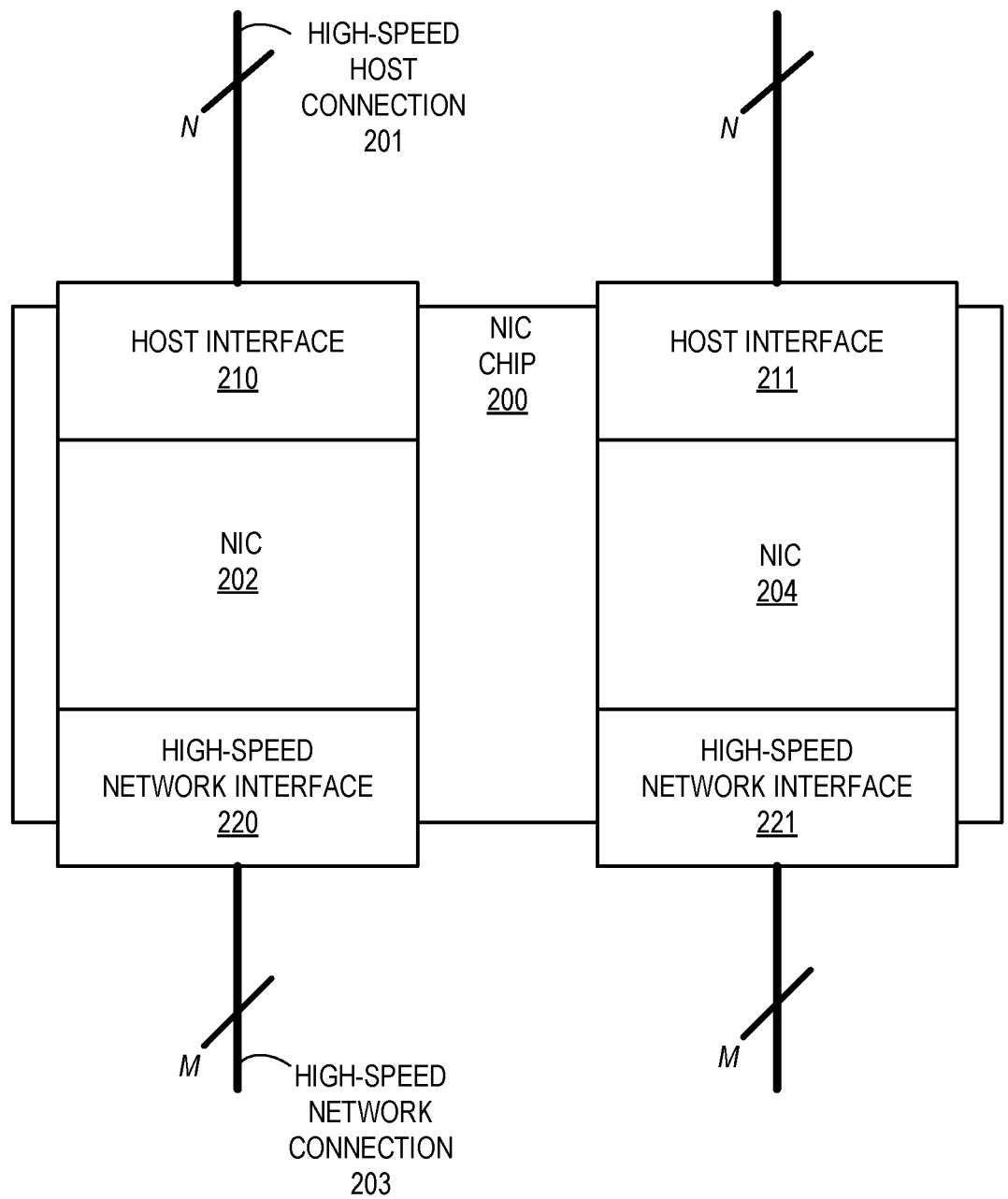
FIG. 2A shows an exemplary NIC chip with a plurality of NICs.

In this disclosure, the description in conjunction with FIG. 1 is associated with the network architecture, and the descriptions in conjunction with FIG. 2A and onward provide more details on the architecture and operations associated with a NIC that supports efficient MPI list matching.

FIG. 1 shows an exemplary network. In this example, a network 100 of switches, which can also be referred to as a "switch fabric," can include switches 102, 104, 106, 108, and 110. Each switch can have a unique address or ID within switch fabric 100. Various types of devices and networks can be coupled to a switch fabric. For example, a storage array 112 can be coupled to switch fabric 100 via switch 110; an InfiniBand (IB) based HPC network 114 can be coupled to switch fabric 100 via switch 108; a number of end hosts, such as host 116, can be coupled to switch fabric 100 via switch 104; and an IP/Ethernet network 118 can be coupled to switch fabric 100 via switch 102. In general, a switch can have edge ports and fabric ports. An edge port can couple to a device that is external to the fabric. A fabric port can couple to another switch within the fabric via a fabric link. Typically, traffic can be injected into switch fabric 100 via an ingress port of an edge switch, and leave switch fabric 100 via an egress port of another (or the same) edge switch. An ingress link can couple a NIC of an edge device (for example, an HPC end host) to an ingress edge port of an edge switch. Switch fabric 100 can then transport the traffic to an egress edge switch, which in turn can deliver the traffic to a destination edge device via another NIC.

Exemplary NIC Architecture

FIG. 2A shows an exemplary NIC chip with a plurality of NICs. With reference to the example in FIG. 1, a NIC chip 200 can be a custom application-specific integrated circuit (ASIC) designed for host 116 to work with switch fabric 100. In this example, chip 200 can provide two independent NICs 202 and 204. A respective NIC of chip 200 can be equipped with a host interface (HI) (e.g., an interface for connecting to the host processor) and one High-speed Network Interface (HNI) for communicating with a link coupled to switch fabric 100 of FIG. 1. For example, NIC 202 can include an HI 210 and an HNI 220, and NIC 204 can include an HI 211 and an HNI 221.

In some embodiments, HI 210 can be a peripheral component interconnect (PCI) or a peripheral component interconnect express (PCIe) interface. HI 210 can be coupled to a host via a host connection 201, which can include N (e.g., N can be 16 in some chips) PCIe Gen 4 lanes capable of operating at signaling rates up to 25 Gbps per lane. HNI 210 can facilitate a high-speed network connection 203, which can communicate with a link in switch fabric 100 of FIG. 1. HNI 210 can operate at aggregate rates of either 100 Gbps or 200 Gbps using M (e.g., M can be 4 in some chips) full-duplex serial lanes. Each of the M lanes can operate at 25 Gbps or 50 Gbps based on non-return-to-zero (NRZ) modulation or pulse amplitude modulation 4 (PAM4), respectively. HNI 220 can support the Institute of Electrical and Electronics Engineers (IEEE) 802.3 Ethernet-based protocols as well as an enhanced frame format that provides support for higher rates of small messages.

NIC 202 can support one or more of: point-to-point message passing based on message passing interface (MPI), remote memory access (RMA) operations, offloading and progression of bulk data collective operations, and Ethernet packet processing. When the host issues an MPI message, NIC 202 can match the corresponding message type. Furthermore, NIC 202 can implement both eager protocol and rendezvous protocol for MPI, thereby offloading the corresponding operations from the host.

Furthermore, the RMA operations supported by NIC 202 can include PUT, GET, and atomic memory operations (AMO). NIC 202 can provide reliable transport. For example, if NIC 202 is a source NIC, NIC 202 can provide a retry mechanism for idempotent operations. Furthermore, connection-based error detection and retry mechanism can be used for ordered operations that may manipulate a target state. The hardware of NIC 202 can maintain the state necessary for the retry mechanism. In this way, NIC 202 can remove the burden from the host (e.g., the software). The policy that dictates the retry mechanism can be specified by the host via the driver software, thereby ensuring flexibility in NIC 202.

Furthermore, NIC 202 can facilitate triggered operations, a general-purpose mechanism for offloading, and progression of dependent sequences of operations, such as bulk data collectives. NIC 202 can support an application programming interface (API) (e.g., libfabric API) that facilitates fabric communication services provided by switch fabric 100 of FIG. 1 to applications running on host 116. NIC 202 can also support a low-level network programming interface, such as Portals API. In addition, NIC 202 can provide efficient Ethernet packet processing, which can include efficient transmission if NIC 202 is a sender, flow steering if NIC 202 is a target, and checksum computation. Moreover, NIC 202 can support virtualization (e.g., using containers or virtual machines).

Figure 2B:
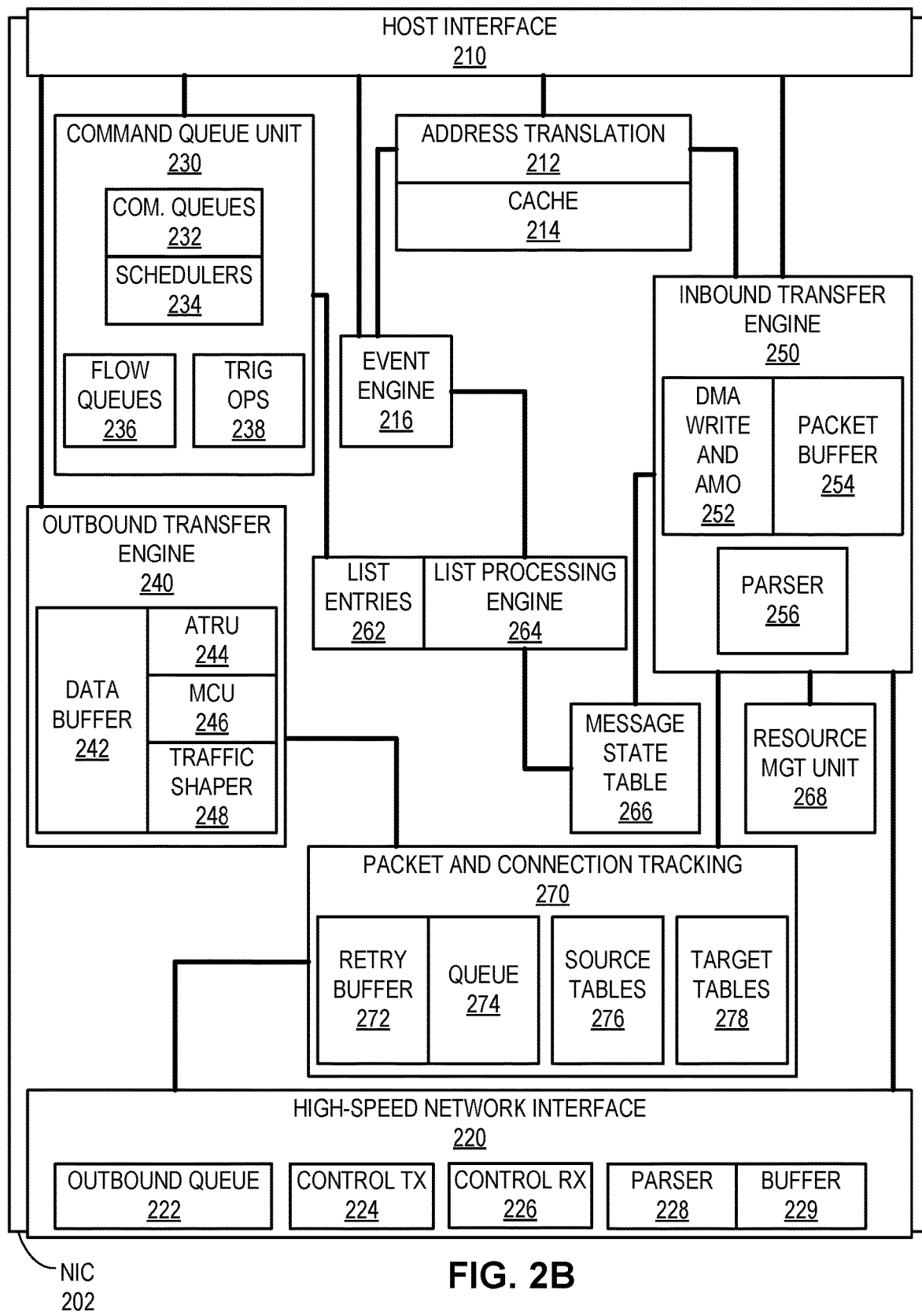
FIG. 2B shows an exemplary architecture of a NIC.

FIG. 2B shows an exemplary architecture of a NIC. In NIC 202, the port macro of HNI 220 can facilitate low-level Ethernet operations, such as physical coding sublayer (PCS) and media access control (MAC). In addition, NIC 202 can provide support for link layer retry (LLR). Incoming packets can be parsed by parser 228 and stored in buffer 229. Buffer 229 can be a PFC Buffer provisioned to buffer a threshold amount (e.g., one microsecond) of delay bandwidth. HNI 220 can also include control transmission unit 224 and control reception unit 226 for managing outgoing and incoming packets, respectively.

NIC 202 can include a command queue (CQ) unit 230. CQ unit 230 can be responsible for fetching and issuing host side commands. CQ unit 230 can include command queues 232 and schedulers 234. Command queues 232 can include two independent sets of queues for initiator commands (PUT, GET, etc.) and target commands (Append, Search, etc.), respectively. Command queues 232 can be implemented as circular buffers. In some embodiments, command queues 232 can be maintained in the main memory of the host. Applications running on the host can write to command queues 232 directly. Schedulers 234 can include two separate schedulers for initiator commands and target commands, respectively. The initiator commands are sorted into flow queues 236 based on a hash function. One of flow queues 236 can be allocated to a unique flow. Furthermore, CQ unit 230 can further include a triggered operations module (or logic block) 238, which is responsible for queuing and dispatching triggered commands.

Outbound transfer engine (OXE) 240 can pull commands from flow queues 236 in order to process them for dispatch. OXE 240 can include an address translation request unit (ATRU) 244 that can send address translation requests to address translation unit (ATU) 212. ATU 212 can provide virtual to physical address translation on behalf of different engines, such as OXE 240, inbound transfer engine (IXE) 250, and event engine (EE) 216. ATU 212 can maintain a large translation cache 214. ATU 212 can either perform translation itself or may use host-based address translation services (ATS). OXE 240 can also include message chopping unit (MCU) 246, which can fragment a large message into packets of sizes corresponding to a maximum transmission unit (MTU). MCU 246 can include a plurality of MCU modules. When an MCU module becomes available, the MCU module can obtain the next command from an assigned flow queue. The data received from the host can be written into data buffer 242. The MCU module can then send the packet header, the corresponding traffic class, and the packet size to traffic shaper 248. Shaper 248 can determine which requests presented by MCU 246 can proceed to the network.

Subsequently, the selected packet can be sent to packet and connection tracking (PCT) 270. PCT 270 can store the packet in a queue 274. PCT 270 can also maintain state information for outbound commands and update the state information as responses are returned. PCT 270 can also maintain packet state information (e.g., allowing responses to be matched to requests), message state information (e.g., tracking the progress of multi-packet messages), initiator completion state information, and retry state information (e.g., maintaining the information required to retry a command if a request or response is lost). If a response is not returned within a threshold time, the corresponding command can be stored in retry buffer 272. PCT 270 can facilitate connection management for initiator and target commands based on source tables 276 and target tables 278, respectively. For example, PCT 270 can update its source tables 276 to track the necessary state for reliable delivery of the packet and message completion notification. PCT 270 can forward outgoing packets to HNI 220, which stores the packets in outbound queue 222.

NIC 202 can also include an IXE 250, which provides packet processing if NIC 202 is a target or a destination. IXE 250 can obtain the incoming packets from HNI 220. Parser 256 can parse the incoming packets and pass the corresponding packet information to a list processing engine (LPE) 264 or a message state table (MST) 266 for matching. LPE 264 can match incoming messages to buffers. LPE 264 can determine the buffer and start address to be used by each message. LPE 264 can also manage a pool of list entries 262 used to represent buffers and unexpected messages. MST 266 can store matching results and the information required to generate target side completion events. MST 266 can be used by unrestricted operations, including multi-packet PUT commands, and single-packet and multi-packet GET commands.

Subsequently, parser 256 can store the packets in packet buffer 254. IXE 250 can obtain the results of the matching for conflict checking. DMA write and AMO module 252 can then issue updates to the memory generated by write and AMO operations. If a packet includes a command that generates target side memory read operations (e.g., a GET response), the packet can be passed to the OXE 240. NIC 202 can also include an event engine (EE) 216, which can receive requests to generate event notifications from other modules or units in NIC 202. An event notification can specify that either a fill event or a counting event is generated. EE 216 can manage event queues, located within host processor memory, to which it writes full events. EE 216 can forward counting events to CQ unit 230.

MPI List Matching

In MPI, send/receive operations are identified with an envelope that can include a number of parameters such as source, destination, message ID, and communicator. The envelope can be used to match a given message to its corresponding user buffer. The whole list of buffers posted by a given process can be referred to as the matching list, and the process of finding the corresponding buffer from the matching list to a given buffer is referred as list matching or tag matching.

In some embodiments, the NIC can provide hardware acceleration of MPI list matching, and the list-processing engine in the NIC can include a plurality (e.g., 2048) of physical endpoints. Each physical endpoint can include four lists: "priority," "overflow," "unexpected," and "software request." The software request list can provide a graceful transition from hardware offload to software managed lists. The priority, overflow, and request lists contain entries that include match criteria and memory descriptor information. The unexpected list contains header information of messages for which a list entry has not been set up in advance. The LPE block of the NIC can include a memory storage for a number (e.g., 64 k) of list entries, divided among the match entries (for matching interface), list entries (for non-matching interface), and unexpected list entries.

In some embodiments, the LPE block of the NIC can be divided into multiple (e.g., four) processing engines, thus enabling the LPE to exploit process-level parallelism in applications or workloads. Each processing engine can access a subset of the list entries. For example, if the LPE block includes a total of 64 k list entries and there are four processing engines, each processing engine can access 16 k list entries. Software can be responsible for allocating physical endpoints to processing engines to provide load balancing.

The LPE can include two list-matching interfaces: one interface receiving target-side commands from the CQ unit, and the other interface receiving message-match requests from an IXE. The IXE sends the first packet of each message to the LPE; the LPE searches the appropriate lists. If a matching entry is found, it can be unlinked and returned to IXE; otherwise, the header may be appended to the unexpected list. Each interface can be called matching or non-matching, depending on the setting of the physical endpoint. CQ command requests and IXE network requests are called match requests in both cases.

In some embodiments, the interfaces for MPI may be initialized in the disabled state. Message matching of incoming traffic only occurs in the hardware offload state. More specifically, the processing engine can perform atomic search and search-with-delete operations in the priority, overflow, and unexpected lists. During the search, the processing engine can dispatch list operations to a correct matching unit.

Figure 3A:
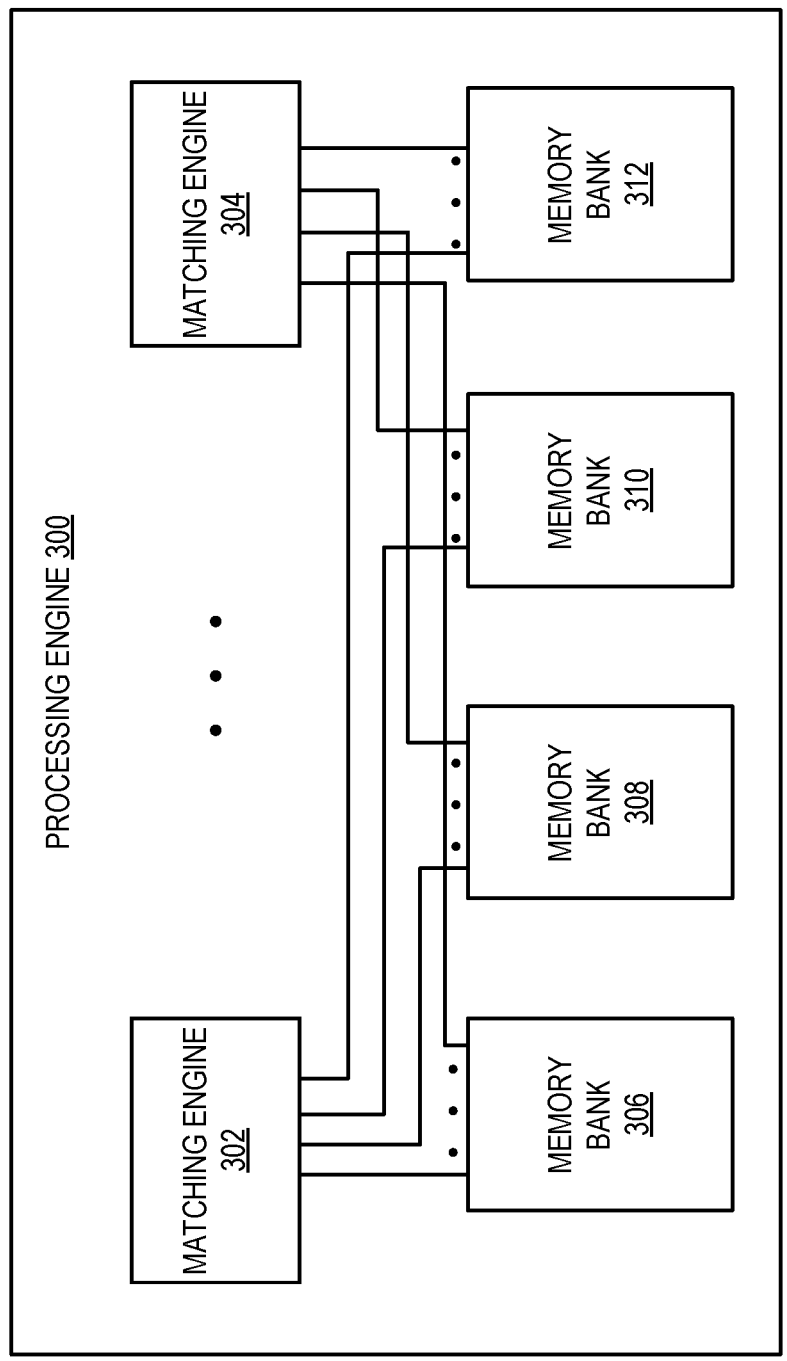
FIG. 3A shows an exemplary architecture of a processing engine.

FIG. 3A shows the exemplary architecture of a processing engine. In this example, processing engine 300 can include a plurality of matching engines (e.g., matching engines 302 and 304) and four memory banks (e.g., memory banks 306, 308, 310, and 312).

In some embodiments, processing engine 300 can include up to eight matching engines. The memory banks can be interconnected to the matching engines using a crossbar to minimize bank conflicts and obtain high parallelism and utilization of the matching engines. Each matching engine can generate a memory address to any of the memory banks in processing engine 300. The multiple matching engines (e.g., matching engines 302 and 304) operate independently of each other. However, these multiple matching engines need to arbitrate for access to the memory banks.

Figure 3B:
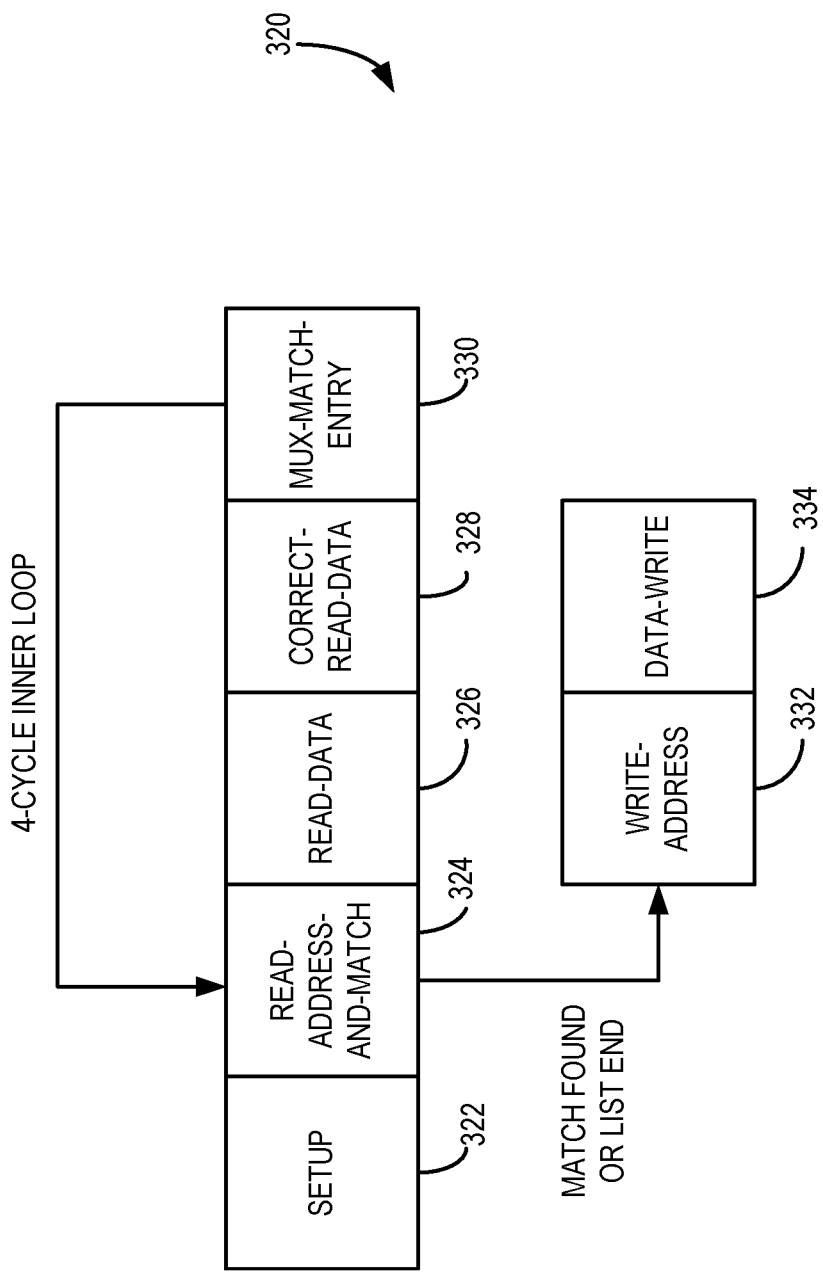
FIG. 3B shows an exemplary operation pipeline of a matching engine.

FIG. 3B shows an exemplary operation pipeline of a matching engine. Matching-engine pipeline 320 can include a number of stages, a setup stage 322, a read-address-and-match stage 324, a read-data stage 326, a correct-read-data stage 328, a mux-match-entry stage 330, a write-address stage 332, and a data-write stage 334.

At setup stage 322, the matching engine captures the match request information from the ready-request queue (RRQ). At read-address-and-match stage 324, the matching engine initiates the read request in each memory bank. Each matching engine can have a logic that decides whether to make a read or write request and to which memory bank. In some embodiments, each memory bank can have an arbiter used to select a matching engine and multiplex the address. Note that, if there are eight parallel matching engines, the arbiter can be an 8:1 arbiter. In parallel with the read address computation, read-address-and-match stage 324 also checks if there is a match on the previous match entry. If there is, it prepares the write update (computes a new offset or deletes an entry). The address and data are then registered to the memory bank at write-address stage 332 and data-write stage 334. At write-address stage 332, the matching engine starts the write access; and at data-write stage 334, the matching engine completes the write operation.

At read-data stage 326, the read data is registered on the output of each memory bank. At correct-read-data stage 328, the read data is corrected at the memory bank. At mux-match-entry stage 330, a multiplexer at each matching engine captures the match entry, which includes the new current address. A number of inner loops are performed, with each loop including read-address-and-match stage 324, read-data stage 326, correct-read-data stage 328, and mux-match-entry stage 330. For the case with four memory banks, matching-engine pipeline 320 can include four cycles. Each matching engine includes space to hold the result of each operation. An arbiter selects a result from the multiple matching engines to send to the output arbiter block. When the output arbiter block consumes a result, the matching engine that produces the result can fetch another command from the RRQ.

The pipeline shown in FIG. 3B can provide a number of advantages. First, the overlapping between the match-attempt pipeline stage and the match termination condition (e.g., read-address-and-match stage 324) can reduce latency in the matching engine. Second, pipeline 320 can provide a unified search pipeline for searching the priority and unexpected list and for network searches and host append commands.

In some embodiments, to increase parallelism and avoid blocking by endpoint and traffic class, the NIC can provide list-matching acceleration by separation of queues, with each endpoint network interface having its own queue. More specifically, the match-request queues ensure that, for matching interfaces, only one operation per physical endpoint is processed at a time; and for non-matching interfaces, concurrent access to certain persistent list entries can be allowed. Within a physical endpoint, command requests need to be performed in the order that they arrive, and network match requests need to be performed in the order that they arrive. However, there is no ordering requirement between commands and network requests. The separated queues also ensure that requests from one physical endpoint cannot be blocked by requests from another physical endpoint. Similarly, requests in one traffic class cannot block requests in other traffic classes.

Figure 4A:
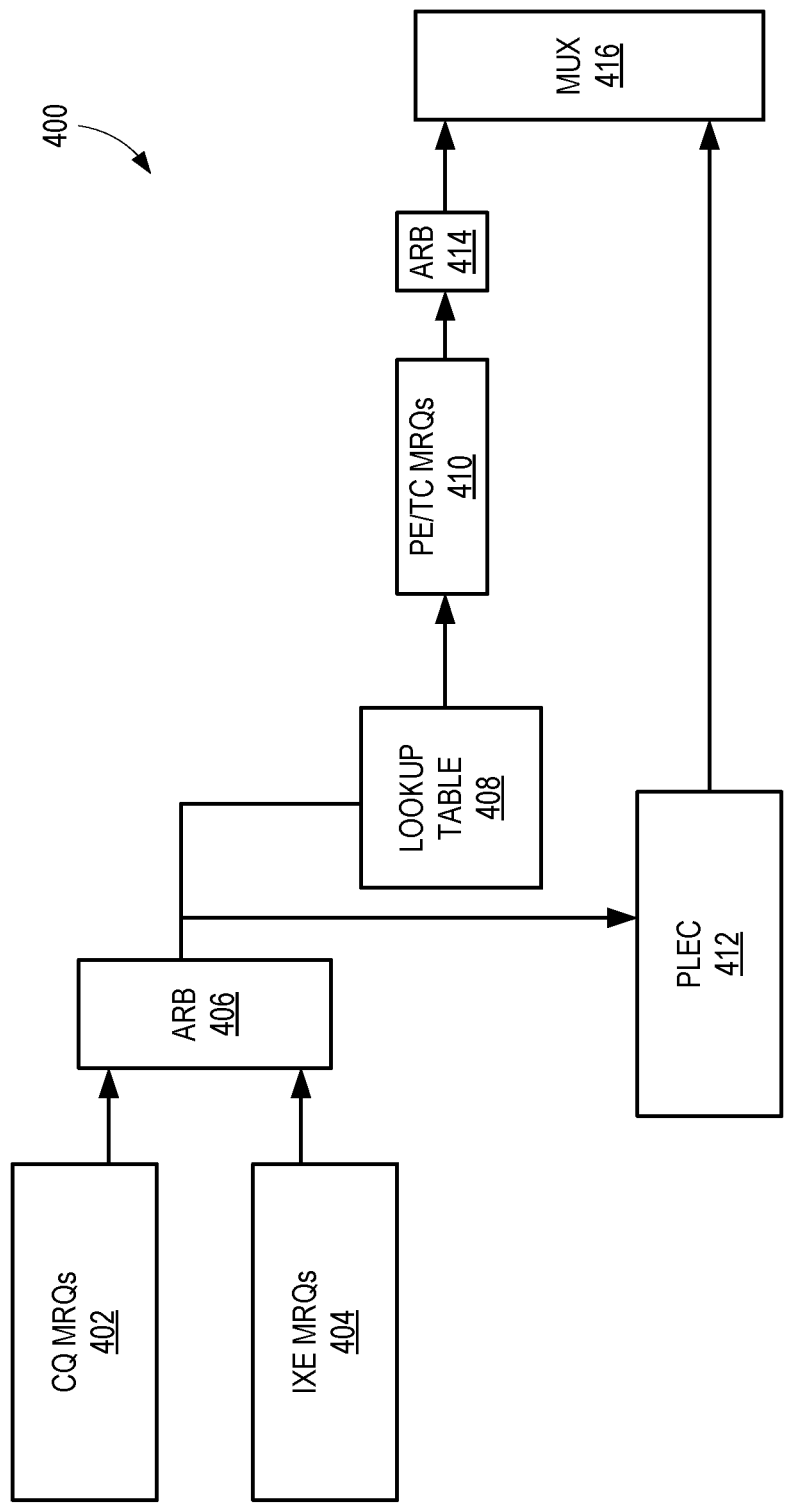
FIG. 4A illustrates exemplary match request-queues.

FIG. 4A illustrates exemplary match request-queues. Match-request-queuing block 400 can include two ranks of queues. The first rank of queues includes CQ match-request queues (MRQs) 402 for queuing CQ commands and IXE match-request queues 404 for queuing IXE requests, with each queue indexed by the physical portal index. Each physical endpoint corresponds to a CQ match-request queue and an IXE match-request queue. For a NIC supporting 2048 physical endpoints, CQ match-request queues 402 can include 2048 CQ match-request queues, and IXE match-request queues 404 can include 2048 IXE match-request queues.

One or more arbitrators 406 can be used to select between CQ match-request queues 402 and IXE match-request queues 404, and to select among the plurality of queues in each type of queue. In some embodiments, a standard arbitration mechanism (e.g., round-robin) can be used for arbitration.

When a match request is dequeued from one of these queues, a lookup table 408 is inspected to determine the processing engine (PE) for the physical portal index. Lookup table 408 can be an array of flops that holds the processing engine number for each physical endpoint and can be accessed in parallel. The match request is then enqueued in an appropriate processing-engine/traffic-class match request queue, which belongs to the second rank of queues (processing-engine/traffic-class (PE/TC) MRQs 410) unless it is an IXE request that matches in the persistent list entry (LE) cache (PLEC) 412. A detailed discussion of PLEC 412 follows. An arbitrator 414 can select among PE/TC MRQs 410, and a multiplexer 416 can multiplex the output of arbitrator 414 and PLEC 412.

In some embodiments, to further increase the list-matching speed, the system can also use a unified processing pipeline to search persistent list entries pertaining to an unordered network interface and to search entries pertaining to an ordered network interface. More specifically, the PLEC enables very fast, one-unit delay lookups.

Figure 4B:
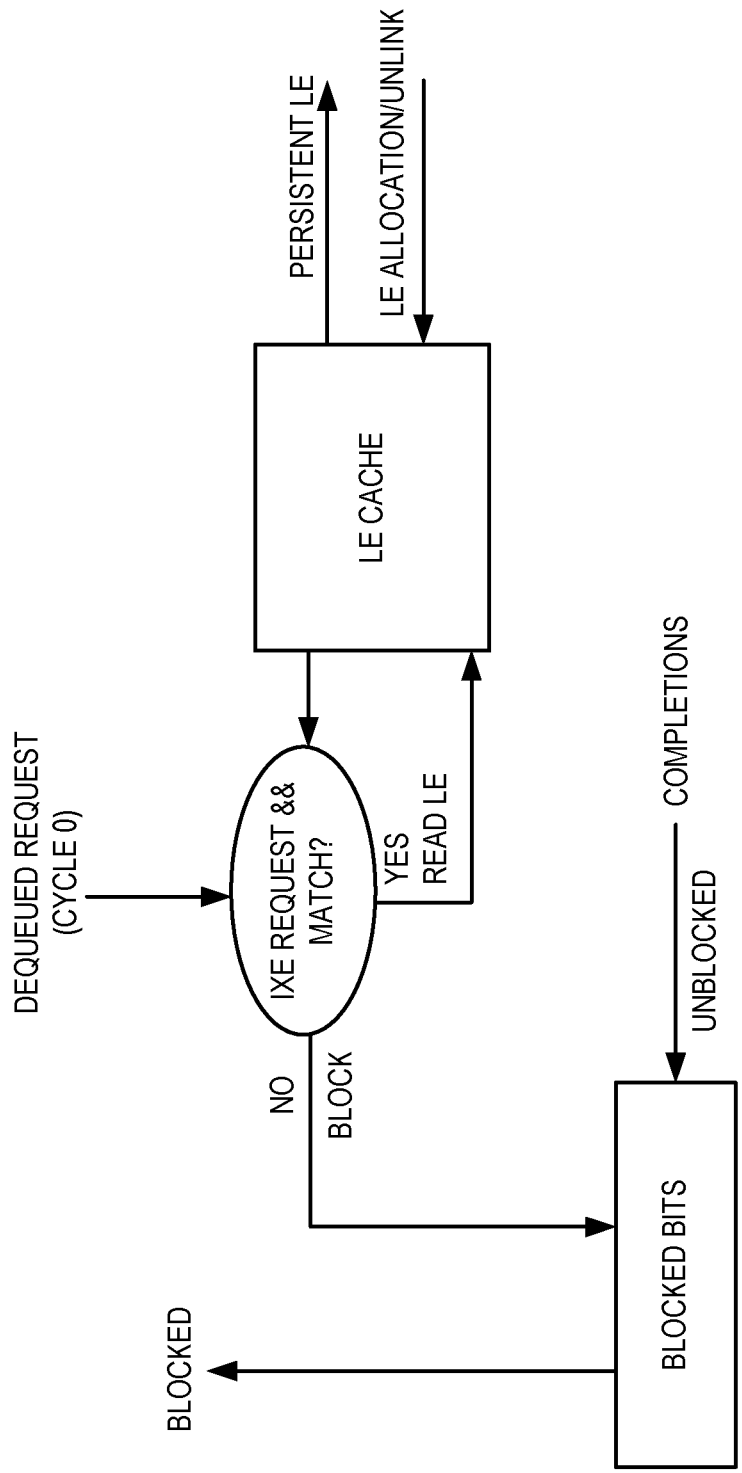
FIG. 4B shows an exemplary block diagram of a persistent list entry cache (PLEC).

FIG. 4B shows an exemplary block diagram of a persistent list entry cache (PLEC). The PLEC stores a number of entries (e.g., up to 256), matching on the physical portal index. When a physical endpoint has an entry in the cache, the PLEC allows its physical endpoint match request queue to be dequeued at a full rate without blocking.

When an IXE match-request queue (MRQ) is dequeued for a physical endpoint that matches in the PLEC, the PLEC forwards the list entry (LE) to the memory block that stores the match requests. When the CQ MRQ is dequeued, or when the IXE MRQ is dequeued and misses in the PLEC, a blocked bit is set for the physical endpoint. The PLEC maintains a blocked bit for each physical endpoint, ensuring that matching requests and commands are processed atomically, while non-matching IXE requests to qualified persistent list entries are satisfied without blocking.

The PLEC intercepts IXE requests that match in its cache before they are enqueued in the processing-engine/traffic-class queue. When a persistent list entry is copied from the cache, a dequeue is not initiated from the processing-engine/traffic-class queue on that cycle so that the persistent link entry (LE) may advance through the pipeline to the memory of the physical endpoint. More specifically, when a PLEC hit occurs, a dequeue from the PE/TC MRQ is suppressed in order to create a bubble in the pipeline. The dequeue is suppressed as the PLEC memory (i.e., the LE cache) is read so that the PLEC data is available when the bubble occurs. The LE from the PLEC and its match-request ID can be forwarded to the memory block of the physical endpoint.

The PLEC receives allocation and de-allocation requests from the processing engines. An allocation request arrives when a processing engine matches a network request with a persistent LE on the priority list that has events relating to packet matching disabled, in a non-matching, non-space-checking physical endpoint. An allocation request for a physical endpoint that hits an existing entry in the PLEC has no effect. Otherwise, an entry is allocated. If the cache is full, an entry is evicted using round-robin selection. When a processing engine unlinks a cacheable list entry, it sends a de-allocation request to the PLEC. If the PLEC contains an entry with a matching physical endpoint, the PLEC evicts the corresponding entry.

The LPE block on the NIC plays an important role in processing MPI messages. As discussed before, MPI implements the "eager" protocol for handling small messages and the "rendezvous" protocol for handling large messages. More specifically, eager implies that the data is sent along with the PUT command (message). The system software sets an upper limit for the Eager messages. For messages having sizes beyond the limit of the Eager message, MPI requires the messages to be sent using the rendezvous protocol.

In the software implementation of the eager protocol, data is delivered to a system buffer, from which the data must be copied to a user buffer. Although this approach reduces synchronization, it is expensive in terms of memory capacity and memory bandwidth. In some embodiments, the NIC can provide a mechanism for the eager messages to be written directly to the user's buffer, in cases where the target address can be determined quickly.

More specifically, when the LPE receives the first request packet (which contains the MPI message envelope), it searches the physical endpoint's priority list for a matching buffer. The matching can be performed based on the source, a set of match bits carried in the message, and buffer-specific match and ignore bits. The matched list entry consists of information that includes the start address, length, translation context, and various attributes where the PUT data (i.e., the eager message) is written, thus allowing the direct-memory access (DMA) dispatch logic to write data directly into the user buffer. If no match is found in the priority list, the LPE searches the overflow list for a description of the memory parameters into which it can write the PUT data, and appends a list entry describing the message to the unexpected list.

In the software implementation of the rendezvous protocol, the bulk data transfer is delayed until the target address is known. While this approach reduces the use of system memory, it requires software intervention in order to ensure progression. In some embodiments, the rendezvous protocol is offloaded to the NIC, providing strong progression.

More specifically, when transferring large MPI messages, the initiator can send a small initial message containing the MPI envelope used for matching and a modest amount of eager data. On completion of the match operation, the target performs a GET to transfer the bulk data to the user buffer. This can enhance the network performance, because bulk data is delivered as GET responses, which are unordered. The network can adaptively route them on a packet-by-packet basis.

If a rendezvous request ends up on the unexpected list, the GET is launched when the user process posts the matching append. Launch of the rendezvous GET is the same for both cases; it is the completion of the match of a rendezvous PUT request that triggers the launch.

This is a valuable offload. MPI applications are expected to post non-blocking receives early and then return to computation. Offloading rendezvous to the NIC ensures good overlap of computation and communication. The NIC performs the match and asynchronously instantiates the bulk data movement, thus providing strong progression.

Figure 5:
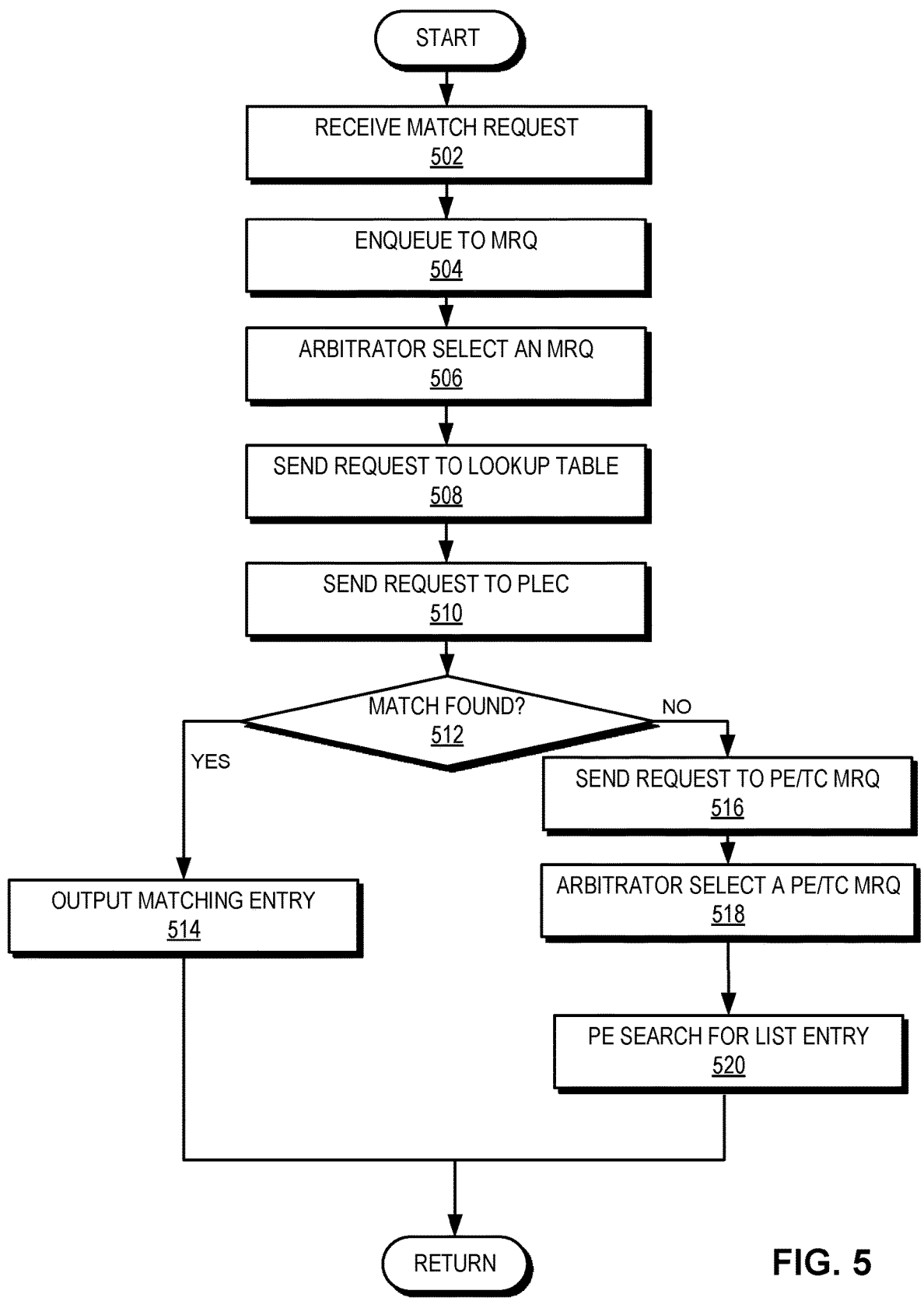
FIG. 5 shows a flow chart of performing list matching in a NIC.

FIG. 5 shows a flow chart of performing list matching in a NIC. During operation, the NIC may receive a match request (operation 502). The match request can be a command from the CQ for manipulating the lists or updating the physical endpoint state, or a message-match request from the IXE. The match request can be enqueued to an appropriate MRQ based on its type (operation 504). An arbitrator selects an MRQ to dequeue a match request (operation 506) and sends the dequeued match request to a lookup table, also referred to as the processing engine map, to determine a processing engine for processing the match request (operation 508). The determination can be based on the physical portal index (i.e., the identification of the physical endpoint).

The match request is also sent to the PLEC (operation 510), which attempts to find a match (operation 512). In response to a match found in the PLEC, the PLEC outputs the matching entry (operation 514). Otherwise, the match request is sent to a PE/TC MRQ (operation 516). An arbitrator selects a PE/TC MRQ to dequeue (operation 518). In some embodiments, the arbitration may occur in two steps. At the first step, a ready processing engine is selected using round-robin. At the second step, a ready TC within that processing engine can be selected using a weighted round-robin arbitration, with each TC having a predetermined weight factor.

The dequeued request from the PE/TC MRQ is sent to the corresponding processing engine, which in turn searches for the matching list entry (operation 520). The matching operations of the processing engine are shown in FIG. 3B.

Exemplary Computer System

Figure 6:
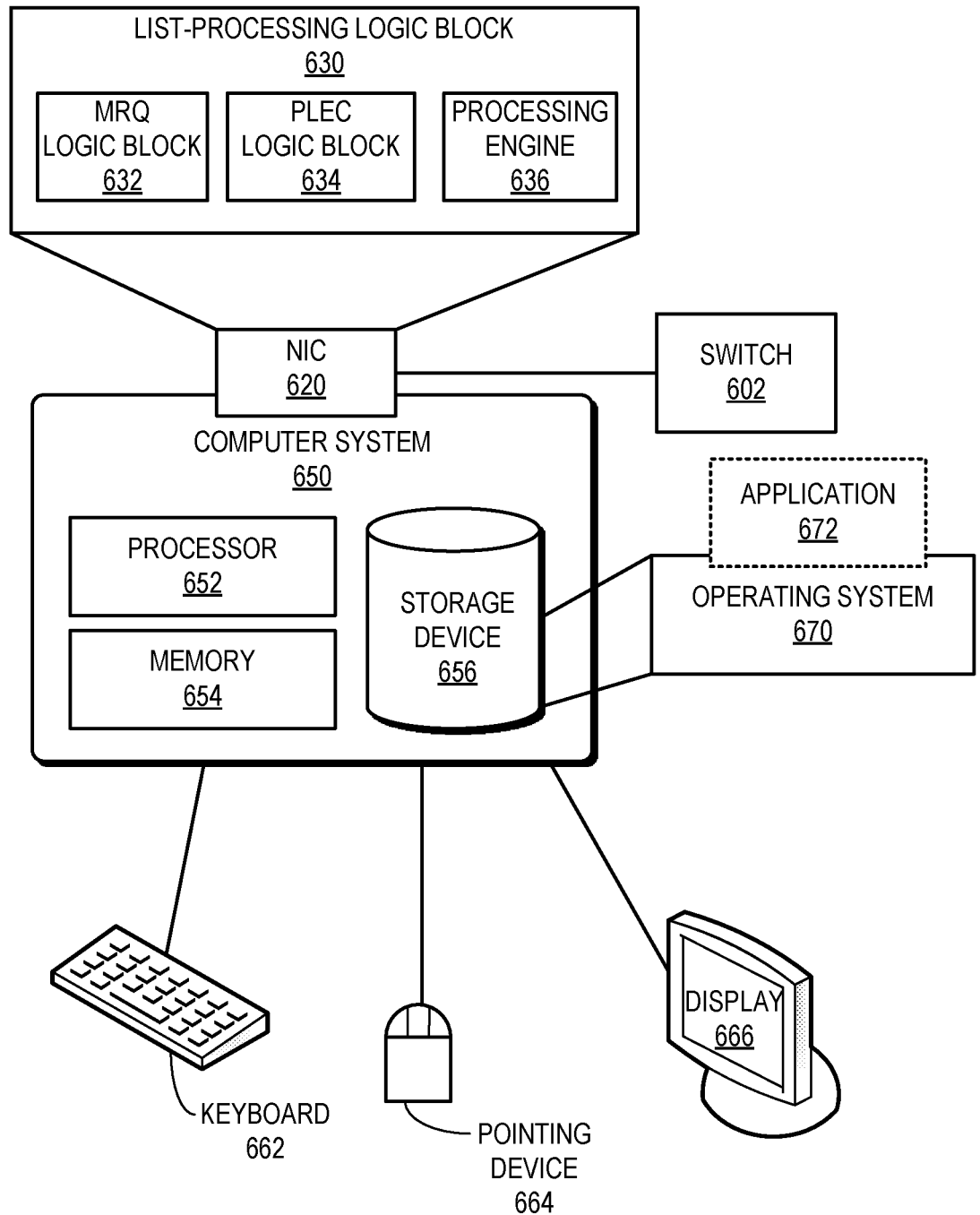
FIG. 6 shows an exemplary computer system equipped with a NIC that facilitates MPI list matching.

FIG. 6 shows an exemplary computer system equipped with a NIC that facilitates MPI list matching. Computer system 650 includes a processor 652, a memory device 654, and a storage device 656. Memory device 654 can include a volatile memory device (e.g., a dual in-line memory module (DIMM)). Furthermore, computer system 650 can be coupled to a keyboard 662, a pointing device 664, and a display device 666. Storage device 656 can store an operating system 670. An application 672 can operate on operating system 670.

Computer system 650 can be equipped with a host interface coupling a NIC 620 that facilitates efficient data request management. NIC 620 can provide one or more HNIs to computer system 650. NIC 620 can be coupled to a switch 602 via one of the HNIs. NIC 620 can include a list-processing logic block 630, as described in conjunction with FIG. 2B. List-processing logic block 630 can include a match-request queue (MRQ) logic block 632 that stores to-be-processed match requests, an PLEC logic block 634 that facilitates fast lookup, and a processing engine 636 for matching the incoming match request to a list entry stored in the memory bank.

In summary, the present disclosure describes a NIC that facilitates MPI list matching. The NIC can include a host interface, a network interface, and a hardware LPE. The host interface can couple the NIC to a host device. The network interface can couple the NIC to a network. The hardware LPE can achieve high-speed list matching. A high degree of parallelism can be achieved by implementing multiple processing engines (PEs) and multiple memory banks within a processing engine. Because each processing engine or TC is allocated with its own queue, the system prevents a processing engine or TC from blocking queues of other processing engine or TCs. In the hardware list-processing engine, the match pipeline stage and the match termination condition overlap to reduce latency. The NIC also enables the offloading of the processing of the MPI messages, including both eager and rendezvous messages.

The methods and processes described above can be performed by hardware logic blocks, modules, logic blocks, or apparatus. The hardware logic blocks, modules, or apparatus can include, but are not limited to, application-specific integrated circuit (ASIC) chips, field-programmable gate arrays (FPGAs), dedicated or shared processors that execute a piece of code at a particular time, and other programmable-logic devices now known or later developed. When the hardware logic blocks, modules, or apparatus are activated, they perform the methods and processes included within them.

The methods and processes described herein can also be embodied as code or data, which can be stored in a storage device or computer-readable storage medium. When a processor reads and executes the stored code or data, the processor can perform these methods and processes.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A network interface controller (NIC), comprising:
   a host interface to couple a host device;
   a network interface to couple a network; and
   a hardware list-processing engine (LPE) to:
     receive a match request; and
     perform message passing interface (MPI) list matching based on the received match request,
     wherein the LPE comprises a persistent list entry cache (PLEC) to store previously matched list entries, and
     wherein performing the MPI list matching comprises bypassing a processing pipeline comprising a lookup table and a number of match-request queues in response to a matched entry being found in the PLEC for the received match request.

2. The network interface controller of claim 1, wherein the match request comprises:
   a match request corresponding to a command received via the host interface; or
   a match request corresponding to a message received via the network interface.

3. The network interface controller of claim 2, wherein the LPE is further to:
   maintain a first set of match-request queues for match requests corresponding to received commands; and
   maintain a second set of match-request queues for match requests corresponding to received messages;
   wherein a number of queues in the first or second set of match-request queues corresponds to a number of physical endpoints supported by the network interface controller.

4. The network interface controller of claim 2, wherein the message is an MPI message.

5. The network interface controller of claim 4, wherein the message is based on an eager protocol or a rendezvous protocol associated with MPI.

6. The network interface controller of claim 1, wherein the LPE further comprises a plurality of processing elements; and wherein a respective processing element comprises a plurality of matching engines and a plurality of memory banks storing one or more lists, wherein the memory banks are interconnected with the matching engines using a crossbar.

7. The network interface controller of claim 6, wherein a respective matching engine comprises a unified search pipeline for searching the one or more lists, and wherein the one or more lists comprise a priority list and an unexpected list.

8. The network interface controller of claim 6, wherein a respective matching engine comprises a single pipeline stage to perform, in parallel, a match operation on a previous match request and a computation to determine a current read or write address.

9. The network interface controller of claim 1, wherein the LPE is further to perform atomic search operations in a plurality of lists.

10. A method, comprising:
    receiving, by a network interface controller (NIC), a match request, wherein the NIC comprises a host interface to couple a host device and a network interface to couple a network; and
    performing, by a hardware list-processing engine (LPE) in the NIC, message passing interface (MPI) list matching based on the received match request,
    wherein the LPE comprises a persistent list entry cache (PLEC) to store previously matched list entries, and
    wherein performing the MPI list matching comprises bypassing a processing pipeline comprising a lookup table and a number of match-request queues in response to a matched entry being found in the PLEC for the received match request.

11. The method of claim 10, wherein the match request comprises:
    a match request corresponding to a command received via the host interface; or
    a match request corresponding to a message received via the network interface.

12. The method of claim 11, further comprising:
    enqueuing, by the LPE, match requests corresponding to received commands in a first set of match-request queues; and
    enqueuing, by the LPE, match requests corresponding to received messages in a second set of match-request queues;
    wherein a number of queues in the first or second set of match-request queues corresponds to a number of physical endpoints supported by the NIC.

13. The method of claim 11, wherein the message is an MPI message.

14. The method of claim 13, wherein the message is based on an eager protocol or a rendezvous protocol associated with MPI.

15. The method of claim 10, wherein performing the MPI list matching comprises:
    selecting, from a plurality of processing elements within the hardware list-processing engine, a processing element to process the request; and
    selecting, from a plurality of matching engines within a respective processing element, a matching engine to perform a match operation, wherein a plurality of memory banks storing one or more lists are interconnected with the plurality of matching engines using a crossbar.

16. The method of claim 15, wherein a respective matching engine comprises a unified search pipeline for searching the one or more lists, and wherein the one or more lists comprise a priority list and an unexpected list.

17. The method of claim 15, wherein a respective matching engine performs the match operation on a previous match request, in parallel, with a computation to determine a current read or write address.

18. The method of claim 10, wherein performing the MPI list matching comprises performing atomic search operations in a plurality of lists.

* * * * *